United States Patent
Suzuka

(10) Patent No.: US 8,606,094 B2
(45) Date of Patent: Dec. 10, 2013

(54) POSITION CONTROLLER FOR OPTICAL ELEMENT

(71) Applicant: Hoya Corporation, Tokyo (JP)

(72) Inventor: Shinya Suzuka, Saitama (JP)

(73) Assignee: Hoya Corporation, Tokyo (JP)

( * ) Notice: Subject to any disclaimer, the term of this patent is extended or adjusted under 35 U.S.C. 154(b) by 0 days.

(21) Appl. No.: 13/731,196

(22) Filed: Dec. 31, 2012

(65) Prior Publication Data

US 2013/0188066 A1 Jul. 25, 2013

(30) Foreign Application Priority Data

Jan. 19, 2012 (JP) ................................. 2012-009385

(51) Int. Cl.
*G03B 17/04* (2006.01)

(52) U.S. Cl.
USPC ............................................ 396/55; 396/350

(58) Field of Classification Search
USPC ........................................... 396/55, 349, 350
See application file for complete search history.

(56) References Cited

U.S. PATENT DOCUMENTS

| 7,515,182 | B2 | 4/2009 | Omiya et al. | |
|---|---|---|---|---|
| 8,023,812 | B2* | 9/2011 | Suzuka | 396/55 |
| 8,090,249 | B2* | 1/2012 | Suzuka | 396/55 |
| 8,121,467 | B2* | 2/2012 | Suzuka | 396/55 |
| 8,396,358 | B2* | 3/2013 | Suzuka | 396/55 |
| 8,422,874 | B2* | 4/2013 | Suzuka | 396/55 |
| 8,451,544 | B2* | 5/2013 | Suzuki | 359/704 |
| 8,498,528 | B2* | 7/2013 | Suzuka | 396/55 |
| 2011/0274419 | A1* | 11/2011 | Imura et al. | 396/55 |
| 2012/0050865 | A1* | 3/2012 | Homme | 359/557 |
| 2012/0070138 | A1* | 3/2012 | Onishi et al. | 396/55 |
| 2012/0218428 | A1* | 8/2012 | Suzuka | 348/208.7 |
| 2012/0218429 | A1* | 8/2012 | Suzuka | 348/208.11 |
| 2012/0218635 | A1* | 8/2012 | Suzuka | 359/554 |
| 2012/0218636 | A1* | 8/2012 | Suzuka | 359/554 |
| 2013/0188066 | A1* | 7/2013 | Suzuka | 348/208.11 |

FOREIGN PATENT DOCUMENTS

| JP | 2006-058455 | 3/2006 |
|---|---|---|
| JP | 2007-101993 | 4/2007 |
| JP | 2007-163961 | 6/2007 |
| JP | 2008-170650 | 7/2008 |

OTHER PUBLICATIONS

U.S. Appl. No. 13/352,564 to Shinya Suzuka, filed Jan. 18, 2012.
U.S. Appl. No. 13/372,955 to Shinya Suzuka, filed Feb. 14, 2012.

* cited by examiner

*Primary Examiner* — W B Perkey
(74) *Attorney, Agent, or Firm* — Greenblum & Bernstein P.L.C.

(57) ABSTRACT

A position controller for an optical element of a photographing optical system, includes an advancing/retracting ring, an anti-shake moving member supported by the advancing/retracting ring, an insertable/removable moving member which holds the optical element, a rear support member fixed to the advancing/retracting ring; a removal drive member supported by the rear support member to be movable between an insertion allowance position in which the removal drive member is in noncontact with the insertable/removable moving member in the insertion position, to thereby allow the anti-shake moving member to move in a moving range thereof, and a forced removing position in which the removal drive member comes in contact with and presses the insertable/removable moving member to move the insertable/removable moving member from the insertion position to the removed position; and an insertion/removal controller.

13 Claims, 10 Drawing Sheets

POSITION CONTROLLER FOR OPTICAL ELEMENT

BACKGROUND OF THE INVENTION

1. Field of the Invention

The present invention relates to a position controller for an optical element, which can be moved to correct image shake and also radially moved onto and radially removed from an optical axis of an optical system.

2. Description of the Related Art

There has been an increasing number of optical devices such as cameras which are equipped with an anti-shake mechanism (image shake correcting mechanism/ image stabilizing mechanism) that moves a specific optical element such as a lens element or an image sensor (image pickup device) in a plane orthogonal to an optical axis of an optical system to reduce (correct) image shake. In Japanese Unexamined Patent Publication No. 2007-163961, a technique for removing (radially retracting) an image-stabilizing optical element to a position outside an anti-shake driving range (to a position off an optical axis of the optical system) when an optical device that incorporates the anti-shake mechanism moves from an operating state to a lens barrel accommodated state (fully retracted state/non-operating state) in which no pictures are taken has been proposed for the purpose of making a lens barrel compact in size.

The lens barrel disclosed in the above-mentioned Japanese Unexamined Patent Publication No. 2007-163961 is provided, inside a movable ring (provided with at least one lens group) that is capable of moving in an optical axis direction, with a fixed frame, and an oscillating frame is supported by the fixed frame to be movable in a plane orthogonal to the optical axis with steel balls (rollers) held between the oscillating frame and the fixed frame. An image-stabilizing lens group holding frame which holds an image-stabilizing lens group is pivoted on the oscillating frame to be rotatable about a shaft parallel to the optical axis. When an image-stabilizing operation is performed, the oscillating frame is smoothly moved relative to the fixed frame by an actuator via a support using the steel balls. When the lens barrel is accommodated (fully retracted), the moving ring is moved toward the image plane (rearward in the optical axis direction) to approach a CCD mount. Thereupon, a contact portion of the image-stabilizing lens group holding frame comes in contact with a cam surface of a driving portion provided on the CCD mount. A further (rearward) retracting movement of the moving ring causes the contact portion of the image-stabilizing lens group holding frame to slide on the cam surface to thereby rotate the image-stabilizing lens group holding frame about the aforementioned rotational shaft. This rotation of the image-stabilizing lens group holding frame causes the image-stabilizing lens group to be removed (radially moved) from a position on the optical axis. According to such a structure, during the lens barrel retracting operation by which the lens barrel is fully retracted, a load in the optical axis direction is applied to the image-stabilizing lens group holding frame with the cam surface and the contact portion in contact with each other, and this load is also transmitted to the oscillating frame. Since steel balls are held between the oscillating frame and the fixed frame as described above, there is a possibility of dents being formed on the steel ball holding surfaces of the oscillating frame and the fixed frame upon an excessive load (e.g., a severe impact) being applied to the lens barrel in the optical axis direction. Such dents deteriorate the operational accuracy of the oscillating frame. In the above-mentioned Japanese Unexamined Patent Publication No. 2007-163961, as a countermeasure against such a problem, the oscillating frame is positioned on the object side (front side in the optical axis direction) of the fixed frame and is biased in a direction to apply pressure to the steel balls (in a direction to approach the fixed frame) by a biasing spring. Application of a load onto the image-stabilizing lens group holding frame in the optical axis direction by the cam surface of the CCD mount causes the oscillating frame to move toward the object side against the biasing force of the biasing spring, which prevents an excessive load from being applied onto the steel balls.

However, in this structure taught in Japanese Unexamined Patent Publication No. 2007-163961, there is a possibility of the steel balls falling out as a result of the steel ball holding state not being maintained if the degree of freedom in movement of the oscillating frame toward the object side with respect to the fixed frame is excessively high, and accordingly, the biasing spring is required to be capable of providing a biasing force of more than a predetermined magnitude. On the other hand, if the biasing force of the biasing spring is excessively great, the moving load of the oscillating frame on the fixed frame becomes excessively great. Therefore, in order to satisfy a self-contradictory demand for suppressing resistance to movement of the oscillating frame during the image-stabilizing operation while securing the holding of the steel balls, even under the condition in which a pressing force produced via the cam surface of the CCD mount is transmitted to the oscillating frame to thereby cause the oscillating frame to move away from the fixed frame, it becomes extremely difficult to adjust the spring force of the biasing spring.

Additionally, in this structure taught in the above-mentioned Japanese Unexamined Patent Publication No. 2007-163961, loads imposed on the image-stabilizing lens group holding frame in the optical axis direction are unavoidable since the image-stabilizing lens group holding frame is pressed by the cam surface of the CCD mount. The image-stabilizing lens group holding frame is a member for holding a lens group, and the positional accuracy of the image-stabilizing lens group holding frame directly affects the optical performance, so that it is desirable not to impose loads on the image-stabilizing lens group holding frame as much as possible. In addition, since the image-stabilizing lens group holding frame is held by the oscillating frame thereon, the relative position between the contact portion of the image-stabilizing lens group holding frame and the cam surface of the CCD mount varies depending on the position of movement of the oscillating frame, so that it is difficult to precisely determine the mutual contacting point. On this account, a smooth retracting operation of the image-stabilizing lens group holding frame might be sacrificed.

SUMMARY OF THE INVENTION

The present invention has been devised in view of the above-mentioned drawbacks and provides a position controller for an optical element which can be moved to correct image shake and also radially moved onto and radially removed from an optical axis, wherein the position controller, though simple in structure and superior in design flexibility, is configured to achieve a light-duty high-precision driving.

According to an aspect of the present invention, a position controller for an optical element, provided in a photographing optical system which moves between a ready-to-photograph state and an accommodated state in which no pictures are taken, is provided, including an advancing/retracting ring which is movable in an optical axis direction of the photographing optical system, wherein the advancing/retracting ring is moved between a first position at which the photographing optical system is in the ready-to-photograph state and a second position at which the photographing optical system is in the accommodated state; an anti-shake moving member which is supported by the advancing/retracting ring therein to be movable along a first plane orthogonal to the optical axis; all insertable/removable moving member which holds the optical element and is supported by the anti-shake moving member to be movable between an insertion position in which the optical element is positioned on the optical axis and a removed position in which the optical element is removed from the optical axis; an insertion holder which holds the insertable/removable moving member in the insertion position when the photographing optical system is in the ready-to-photograph state; a rear support member which is fixed to the advancing/retracting ring at a position closer to the image plane than the anti-shake moving member, with respect to the optical axis; a removal drive member which is supported by the rear support member to be movable along a second plane orthogonal to the optical axis between an insertion allowance position in which the removal drive member is in noncontact with the insertable/removable moving member in the insertion position, to thereby allow the anti-shake moving member to move in a moving range thereof, and a forced removing position in which the removal drive member comes in contact with and presses the insertable/removable moving member to move the insertable/removable moving member from the insertion position to the removed position; and an insertion/removal controller which holds the removal drive member in the insertion allowance position when the photographing optical system is in the ready-to-photograph state, and moves the removal drive member from the insertion allowance position to the forced removing position when the advancing/retracting ring moves from the first position to the second position.

It is desirable for the position controller to include an anti-shake driver which drives the anti-shake moving member in the first plane to perform an image-stabilizing operation in accordance with vibrations applied to the photographing optical system, wherein the rear support member is provided with a detector which detects a position of the anti-shake moving member that is driven by the anti-shake driver.

It is desirable for the insertable/removable moving member to be pivotally supported by the anti-shake moving member to be rotatable about a first rotational shaft that is parallel to the optical axis, and for the removal drive member to be pivotally supported by the rear support member to be rotatable about a second rotational shaft that is parallel to the first rotational shaft.

It is desirable for the rear support member to include a rotational limit wall, around the second rotational shaft, which comes into contact with the removal drive member to prevent the removal drive member from further rotating when the removal drive member rotates from the forced removing position to the insertion allowance position.

It is desirable for the rear support member to be formed as a partly-opened frame surrounding the optical axis which has a circumferential opening in a circumferential direction thereof, and for the second rotational shaft to project from a shaft seating portion provided at an end of the partly-opened frame in the circumferential direction.

It is desirable for the insertable/removable moving member to include a pressing-force receiving portion formed as an outer peripheral surface of a cylindrical projection, the axis of which extends parallel to the optical axis. The removal drive member includes a removal pressing portion formed as a flat surface extending in a radial direction of rotation of the removal drive member. When the insertable/removable moving member is in the insertion position and the removal drive member is in the insertion allowance position, the pressing-force receiving portion and the removal pressing portion are spaced away from each other while facing each other. The removal pressing portion comes into contact with the pressing-force receiving portion when the removal drive member rotates from the insertion allowance position toward the forced removing position.

It is desirable for the insertion/removal controller to include an insertion allowing biaser which biases the removal drive member toward the insertion allowance position; and a component force imparting member which is positioned away from the removal drive member in the optical axis direction when the photographing optical system is in the ready-to-photograph state. When the advancing/retracting ring moves in the optical axis direction from the first position to the second position, the component force imparting member comes in contact with the removal drive member while reducing a distance between the component force imparting member and the removal drive member in the optical axis direction and imparts a component force against the removal drive member to move the removal drive member from the insertion allowance position to the forced removing position.

It is desirable for the component force imparting member to be provided on a stationary member positioned closer to the image plane than the advancing/retracting ring when the photographing optical system is in the ready-to-photograph state, wherein the component force imparting member includes a projection which projects toward the object side.

It is desirable for the position controller to further include an anti-shake guide member which is held between a first surface formed on the advancing/retracting ring to face toward the image plane and a second surface formed on the anti-shake moving member to face toward the object side, and allows the anti-shake moving member to move relative to the advancing/retracting ring in the first plane; and a holding biaser which biases the anti-shake moving member with respect to the advancing/retracting ring in a direction to bring the first surface and the second surface close to each other so that the anti-shake guide member remains held between the first surface and the second surface.

It is desirable for the insertion holder to include an inserting biaser which biases and moves the insertable/removable moving member toward the insertion position; and a stopper provided on the anti-shake moving member, the insertable/removable moving member being brought into contact with the stopper by a biasing force of the inserting biaser to thereby determine the insertion position.

It is desirable for the position controller to be incorporated in a camera having a retractable lens barrel.

It is desirable for the advancing/retracting ring to be guided linearly in the optical axis direction without rotating in the retractable lens barrel.

It is desirable for the anti-shake guide member to include at least one spherical roller.

According to the present invention, in a position controller for an optical element in which the anti-shake moving member, which makes the optical element perform a moving operation for image shake correction, and the insertable/removable moving member, which makes the optical element radially move onto and radially away from an optical axis, are supported inside the advancing/retracting ring, the insertable/removable moving member is pressed and moved to the removed position by the removal drive member that is supported by the rear support member that is fixed to the advancing/retracting ring, and accordingly, the lens barrel that incorporates the photographing optical system can be made to perform a lens barrel retracting operation from a ready-to-photograph state to the accommodated state with no load in the optical axis direction imposed on the insertable/removable moving member which holds the optical element, or the anti-shake moving member which supports the insertable/removable moving member. In addition, the insertable/removable moving member can be made to move to the removed position from the insertion position without being influenced by the position of the anti-shake moving member. Additionally, the structure in which the removal drive member is supported by the rear support member that is fixed to the advancing/retracting ring at a position closer to an image plane side than the anti-shake moving member makes it possible to position the removal drive member without being subject to constraints of the advancing/retracting ring and the anti-shake moving member, and enhances the degree of freedom in setting the shapes of the advancing/retracting ring and the anti-shake moving member. Hence, it is possible to perform the image-stabilizing operation and the insertion/removal operation of the optical element with a low load and high precision via a simple structure which is superior in design flexibility.

The present disclosure relates to subject matter contained in Japanese Patent Application No. 2012-009385 (filed on Jan. 19, 2012) which is expressly incorporated herein by reference in its entirety.

BRIEF DESCRIPTION OF THE DRAWINGS

The present invention will be described below in detail with reference to the accompanying drawings in which.

DESCRIPTION OF THE PREFERRED EMBODIMENT

Figure 1:
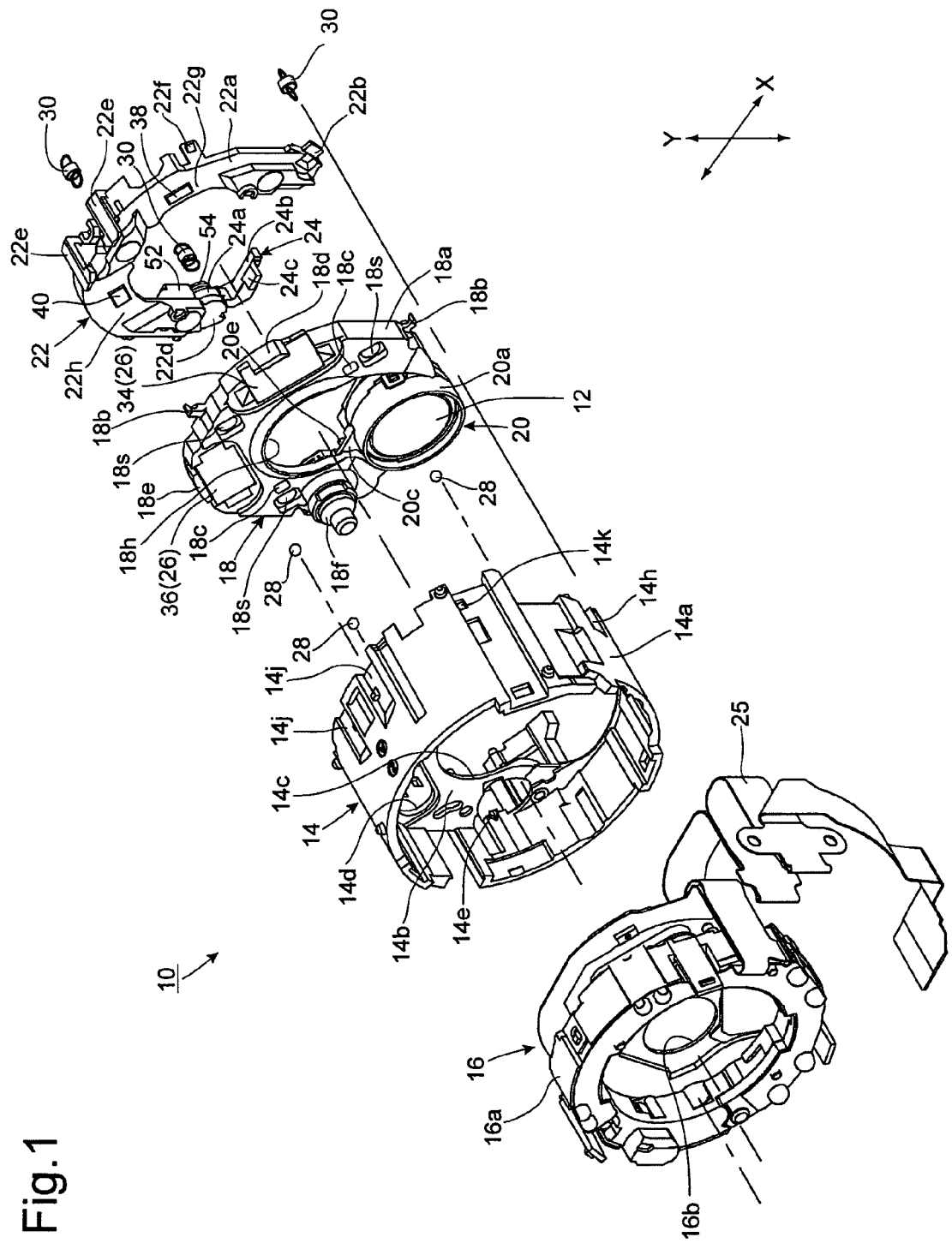
FIG. 1 is a front exploded perspective view of an embodiment of an anti-shake lens unit, according to the present invention, that is designed for a lens shutter camera having a retractable photographic lens.

An anti-shake lens unit 10 shown in the drawings supports an insertable/removable image-stabilizing lens (optical element) 12 which constitutes apart of a photographing optical system of a retractable lens barrel of a camera. The anti-shake lens unit 10 is provided with a linear moving ring (advancing/retracting ring) 14, and is provided in the linear moving ring 14 with a shutter unit (advancing/retracting ring) 16, an anti-shake frame (anti-shake moving member) 18, an insertable/removable frame (insertable/removable moving member) 20, an anti-shake sensor holder (rear support member) 22, a removal drive lever (removal drive member) 24 and an anti-shake drive actuator (anti-shake driver) 26.

Although the overall structure of the lens barrel in which the anti-shake lens unit 10 is incorporated is not shown in the drawings, the linear moving ring 14 is supported in the lens barrel in a manner to be linearly movable in a direction along a photographing optical axis O (shown in FIGS. 7 through 10) of the photographing optical system, and the linear moving ring 14 is moved toward an image plane (second position) from the object side (first position) when the lens barrel is brought into a lens barrel accommodated state (fully retracted state) from a ready-to-photograph state. In the following descriptions, the optical axis direction refers to a direction along or parallel to the photographing optical axis O, the front side refers to the object side with respect to the optical axis direction, and the rear side refers to the image plane side with respect to the optical axis direction. A known cam mechanism, or the like, can be adapted as a mechanism for moving the linear moving ring 14 in the optical axis direction.

Figure 4:
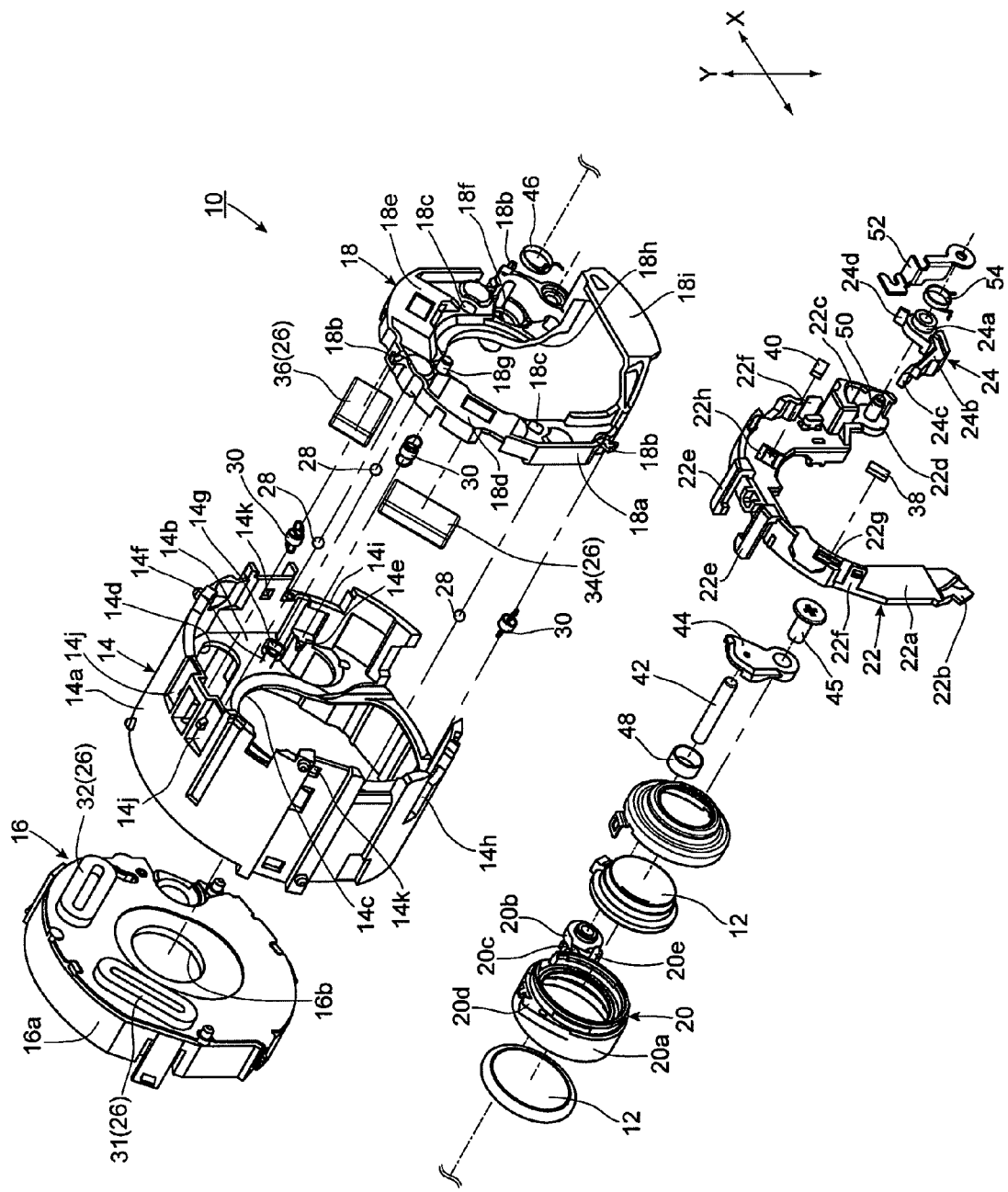
FIG. 4 is a rear exploded perspective view of the anti-shake lens unit.
Figure 5:
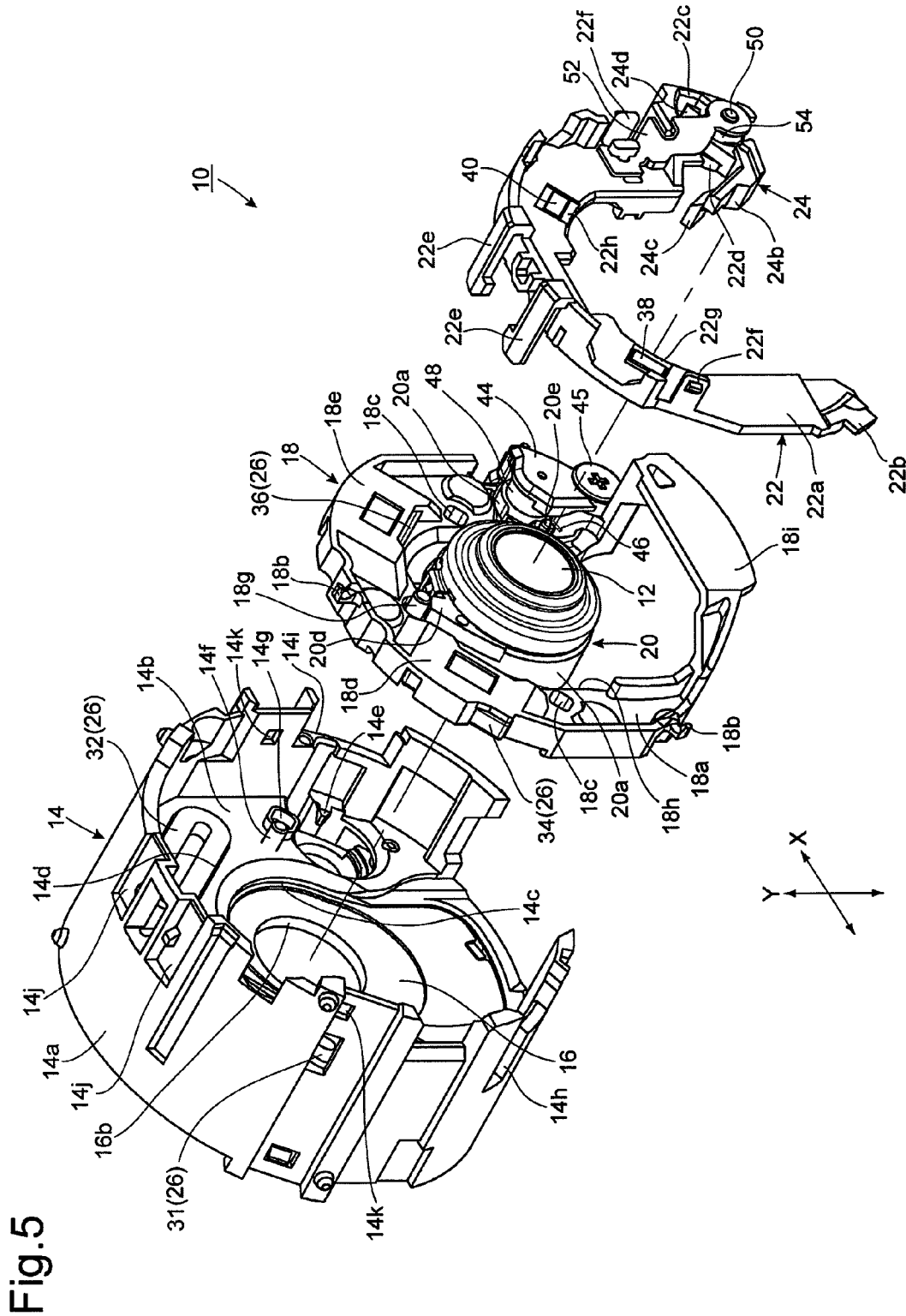
FIG. 5 is a rear exploded perspective view of a linear moving ring, the anti-shake frame, the anti-shake sensor holder and associated elements of the anti-shake lens unit, showing a state where the anti-shake frame and the anti-shake sensor holder are removed from inside of the anti-shake frame.

The linear moving ring 14 is provided with a cylindrical portion 14a which surrounds the photographing optical axis O, and the linear moving ring 14 is provided with an inner wall 14b inside the cylindrical portion 14a. The inner wall 14b is a wall of the linear guide ring 14 which is formed to extend in radial directions of the linear guide ring 14 (i.e., directions substantially orthogonal to the photographing optical axis O). The inner wall 14b is provided with a central opening 14c and two coil insertion holes 14d (only one of which is shown in FIGS. 1, 4 and 5), each of which is formed as a through-hole which extends through the inner wall 14b in the optical axis direction. The inner wall 14b is provided, at three different circumferential positions, with three spring hook projections 14e (only one of which is shown in FIGS. 1, 4 and 5), respectively, and is provided on a rear surface of the inner wall 14b with two movement limit projections 14f and three ball support holes 14g (only one of which is shown in FIGS. 4 and 5). The two movement limit projections 14f are projections which project rearwardly, and the three ball support holes 14g are bottomed holes which are open toward the rear side.

The shutter unit 16 is fixed inside the cylindrical portion 14a and is positioned in front of the inner wall 14b. The shutter unit 16 is provided with a shutter housing 16a including a shutter (not shown) and has a photographing aperture 16b extending through a center of the shutter housing 16a in the optical axis direction. A shutter actuator provided in the shutter unit 16 drives the above-mentioned shutter to open and shut the photographing aperture 16b.

Figure 2:
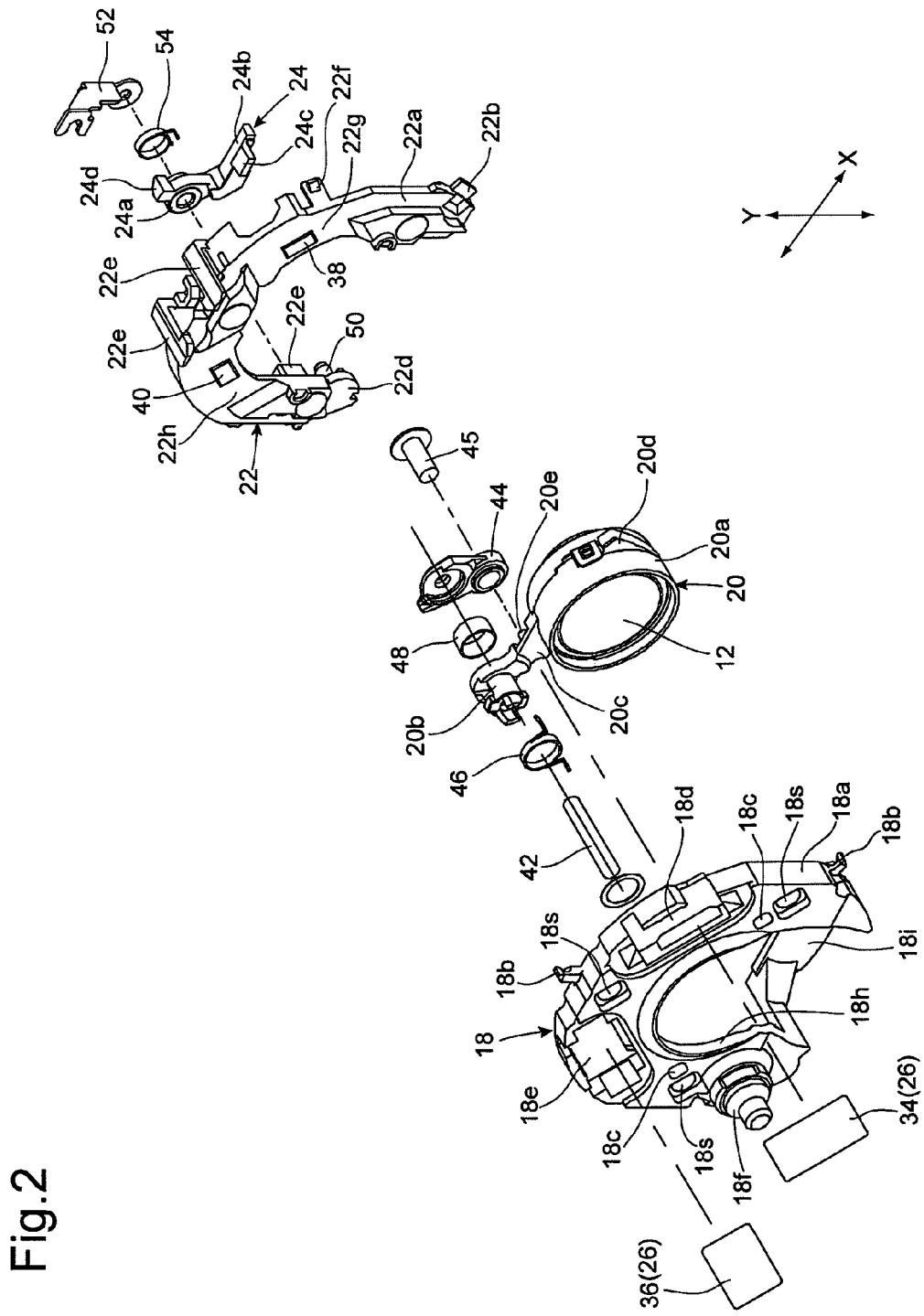
FIG. 2 is a front exploded perspective view of an anti-shake frame, an insertable/removable frame and an anti-shake sensor holder of the anti-shake lens unit, from which some elements are removed.

The anti-shake frame 18 is supported inside the cylindrical portion 14a of the linear moving ring 14 and is positioned behind the inner wall 14b. The outer periphery of a frame body 18a of the anti-shake frame 18 is shaped to face the inner periphery of the cylindrical portion 14a of the linear moving ring 14 with a predetermined clearance so that the frame body 18a is allowed to slightly move in directions orthogonal to the photographing optical axis O in the cylindrical portion 14a. The frame body 18a is provided, on the front thereof at three different positions which face the three ball support holes 14g of the linear moving ring 14, with three ball support holes 18s, respectively (see FIGS. 1 and 2). The three ball support holes 18s are bottomed holes which are open toward the front, and three guide balls (anti-shake guide members) 28 that are formed as spherical rollers are held between three front surfaces and three rear surfaces which face each other in the optical axis direction which are configured from the bottom surfaces of the three ball support holes 18s and the bottom surfaces of the three ball support holes 14g, respectively. In the following descriptions, the bottom surfaces of the three ball support holes 14g and the bottom surfaces of the three ball support holes 18s that hold the three guide balls 28 therebetween are each referred to as a ball contact surface. The three ball contact surfaces (first surfaces) of the three ball support holes 14g are flat and smooth surfaces which lie in a plane substantially orthogonal to the photographing optical axis O, and the three ball contact surfaces (second surfaces) of the ball support holes 18s are flat and smooth surfaces which lie in a plane substantially orthogonal to the photographing optical axis O. The three guide balls 28 are loosely fitted in the three ball support holes 14g and the three ball support holes 18s, respectively, so that there is a clearance between each guide ball 28 and the inner walls of the associated ball support holes 14g and 18s in directions orthogonal to the photographing optical axis O. When positioned in the vicinity of the center of the associated support holes 14g and 18s, each guide ball 28 does not come in contact with the inner walls of the associated ball support holes 14g and 18s.

The anti-shake frame 18 is provided, at different circumferential positions on the outer periphery of the frame body 18a, with three spring hook projections 18b, respectively, and three extension springs (holding biaser) 30 are extended and installed between the three spring hook projections 18b and the three spring hook projections 14e (only one of which is shown in FIGS. 1, 4 and 5) of the linear moving ring 14, respectively. The anti-shake frame 18 is biased in a direction to approach the inner wall 14b of the linear moving ring 14 (i.e., is biased forward) by the biasing force of the three extension springs 30 to make the ball contact surfaces of the three ball support holes 18s press against the three guide balls 28, respectively, to thereby prevent the anti-shake frame 18 from moving forward. In this state, the ball contact surfaces of the three ball support holes 18s are in point contact with the three guide balls 28, respectively, and the anti-shake frame 18 can move in directions orthogonal to the photographing optical axis O by making the ball contact surfaces of the three ball support holes 18s slidingly contact the three guide balls 28 (or while making the three guide balls 28 roll when the three guide balls 28 are not in contact with the inner walls of the three ball support holes 14g and 18s, respectively).

Figure 8:
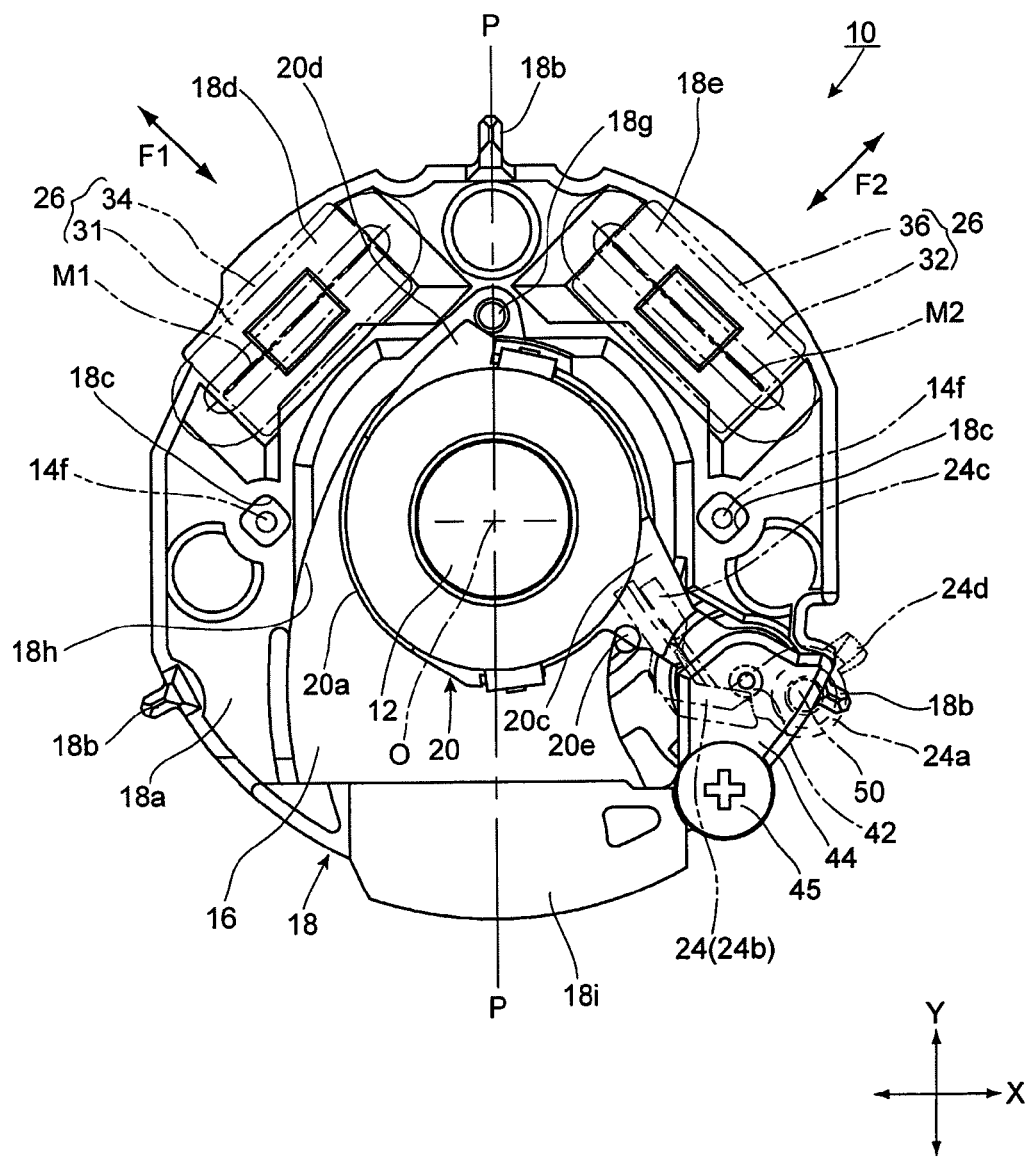
FIG. 8 is a rear elevational view of the anti-shake lens unit in the ready-to-photograph state with the linear moving ring and the anti-shake sensor holder removed, viewed from the image plane side.
Figure 10:
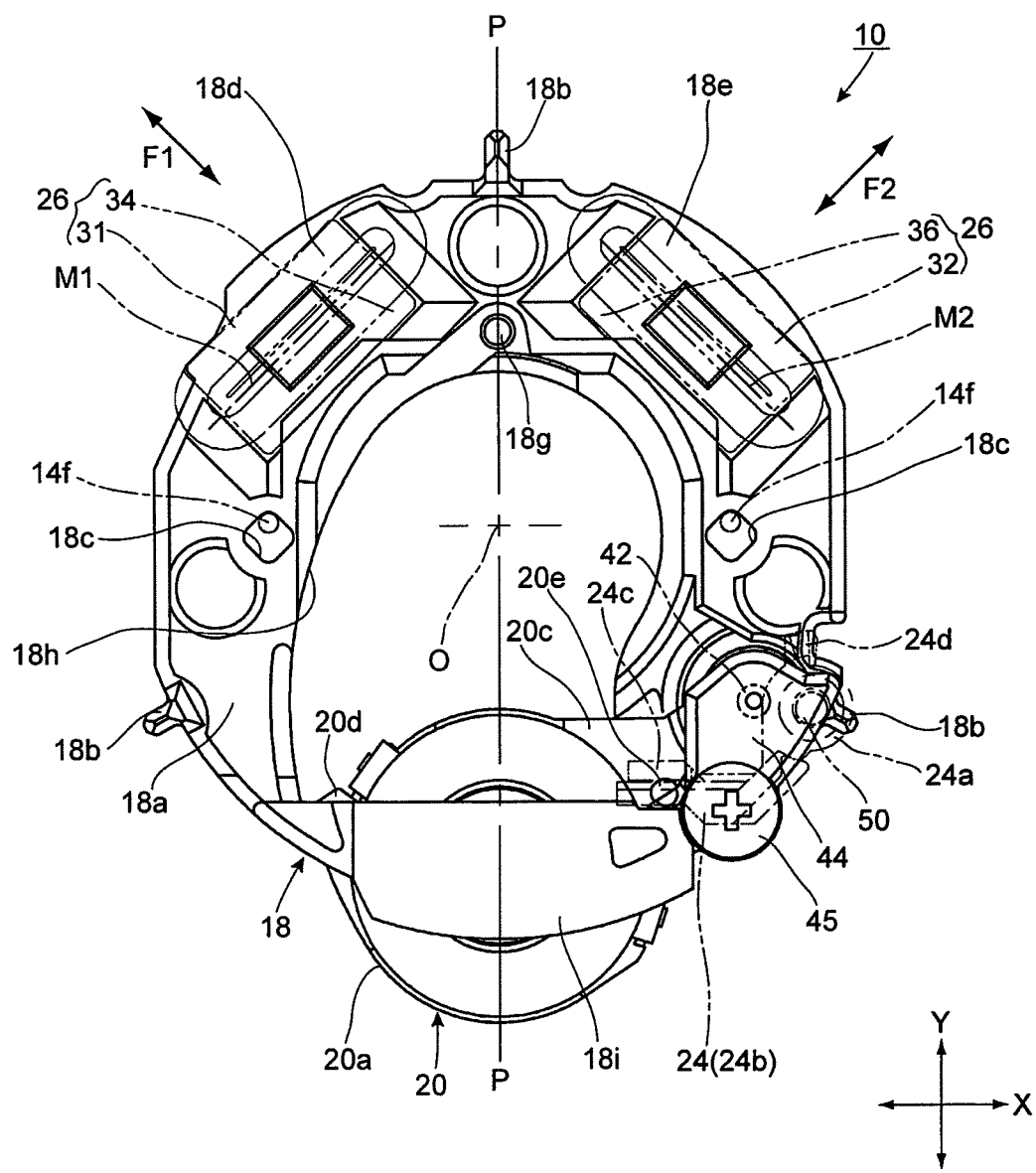
FIG. 10 is a rear elevational view of the anti-shake lens unit in the lens barrel accommodated state with the linear moving ring and the anti-shake sensor holder removed, viewed from the image plane side.

The anti-shake frame 18 is further provided with two movement limit holes (movement limiter) 18c into which the two movement limit projections 14f of the linear moving ring 14 are inserted, respectively. As shown in FIGS. 8 and 10, the inner wall of each movement limit hole 18c is rectangular, generally square in shape in a plane substantially orthogonal to the photographing optical axis O. In the following descriptions, the direction of one of the two diagonal lines across the inner wall of each movement limit hole 18c in a plane orthogonal to the photographing optical axis O refers to the X-axis direction and the direction of the other diagonal line refers to the Y-axis direction. The anti-shake frame 18 can move relative to the linear moving ring 14 in a plane (first plane) orthogonal to the photographing optical axis O within a range until the movement limit projections 14f come into contact with the inner walls of the two movement limit holes 18c, respectively.

The anti-shake frame 18 is driven by the anti-shake drive actuator 26. The anti-shake drive actuator 26 is provided with two coils 31 and 32 which are supported by the shutter unit 16, and is further provided with two permanent magnets 34 and 36 which are supported by the anti-shake frame 18. The two permanent magnets 34 and 36 are fixed to two magnet holding portions 18d and 18e, respectively, which are provided on the anti-shake frame 18. The permanent magnets 34 and 36 are substantially identical in shape and size to each other. Each of the permanent magnets 34 and 36 is in the shape of a narrow, thin rectangular plate. The permanent magnets 34 and 36 are arranged symmetrically with respect to an imaginary plane P (see FIGS. 7 through 10) which lies on the photographing optical axis O and extends in the Y-axis direction. More specifically, opposite sides of a magnetic pole boundary line M1 (see FIGS. 7 through 10) of the permanent magnet 34, which extends in the lengthwise direction thereof and passes through an approximate center of the permanent magnet 34 with respect to the width thereof, are magnetized into north and south poles, respectively. Similarly, opposite sides of a magnetic pole boundary line M2 (see FIGS. 7 through 10) of the permanent magnet 36, which extends in the lengthwise direction thereof and passes through an approximate center of the permanent magnet 36 with respect to the width thereof, are magnetized into north and south poles, respectively. In other words, each of the magnetic pole boundary lines M1 and M2 defines a boundary between north and south poles of each of the permanent magnets 34 and 36, respectively. The magnetic pole boundary line M1 of the permanent magnet 34 and the magnetic pole boundary line M2 of the permanent magnet 36 are inclined to each other so that the distance therebetween (i.e., the distance from the imaginary plane P) becomes increasingly larger in the downward direction (toward a removed position of the insertable/removable frame 20 which will be discussed later) from the upper end in the Y-axis direction (from an insertion position side of the insertable/removable frame 20 which will be discussed later). The inclination angle of each magnetic pole boundary line M1 and M2 with respect to the imaginary plane P is set to approximately 45 degrees. Namely, the lengthwise directions (the magnetic pole boundary lines M1 and M2) of the permanent magnets 34 and 36 are substantially orthogonal to each other.

As shown in FIGS. 4, 8 and 10, each of the coils 31 and 32 is an air-core coil which includes a pair of elongated portions that are substantially parallel to each other and a pair of curved (U-shaped) portions which connect the pair of elongated portions at respective ends thereof. The coils 31 and 32 are substantially identical in shape and size to each other. The coils 31 and 32 are supported on the rear of the shutter unit 16, and in this supporting state, the lengthwise direction of the coil 31 is substantially parallel to the magnetic pole boundary line M1 and the lengthwise direction of the coil 32 is substantially parallel to the magnetic pole boundary line M2. The coils 31 and 32 are connected to a flexible PWB (printed wiring board) 25 which extends from the shutter unit 16, and are also connected to a control circuit board of the camera, in which the present embodiment of the anti-shake lens unit 10 is incorporated, via another flexible PWB (not shown) provided inside the lens barrel. The control of power that is applied to the coils 31 and 32 is performed by a control circuit on the above-mentioned control circuit board.

In the anti-shake drive actuator 26 that has the above described structure, the coil 31 and the permanent magnet 34 face each other in the optical axis direction, and a driving force is generated in a direction substantially orthogonal to the magnetic pole boundary line M1 of the permanent magnet 34 (i.e., orthogonal to the lengthwise direction of the coil 31) in a plane orthogonal to the optical axis O upon the coil 31 being energized. The direction of action of this driving force is shown by a double-headed arrow F1 in FIGS. 7 through 10. Similarly, the coil 32 and the permanent magnet 36 face each other in the optical axis direction, and a driving force is generated in a direction substantially orthogonal to the magnetic pole boundary line M2 of the permanent magnet 36 (i.e., orthogonal to the lengthwise direction of the coil 32) in a plane orthogonal to the optical axis O upon the coil 32 being energized. The direction of action of this driving force is shown by a double-headed arrow F2 in FIGS. 7 through 10. The direction of action of each of the two aforementioned driving forces (F1, F2) intersects both the X-axis direction and the Y-axis direction at an angle of approximately 45 degrees, so that the anti-shake frame 18 can be moved to any arbitrary position in a plane (first plane) orthogonal to the photographing optical axis O by controlling the passage of current through each of the coils 31 and 32. As described above, the moving range of the anti-shake frame 18 is limited by engagement of the inner walls of the two movement limit holes 18c with the two movement limit projections 14f, respectively.

The anti-shake sensor holder 22 is fixed to the inside of the linear moving ring 14 and is positioned behind the anti-shake frame 18. The anti-shake sensor holder 22 is provided with a C-shaped holder body 22a. More specifically, the holder body 22a is formed into a partly-opened frame surrounding the photographing optical axis O and covers the rear side of the frame body 18a and has a circumferential opening (disconnected portion) in the circumferential direction of the holder body 22a. The anti-shake sensor holder 22 is provided, at one of the circumferential ends of the holder body 22a between which the above-mentioned circumferential opening is formed, with a fitting lug 22b which projects radially outwards. The anti-shake sensor holder 22 is provided at the other circumferential end of the holder body 22a with a plate-like shaft seating portion 22d which lies in a plane orthogonal to the optical axis O. The anti-shake sensor holder 22 is provided with a rotational shaft (second rotational shaft) 50 which extends rearward from the shaft seating portion 22d in a direction parallel to the photographing optical axis O. A rotational limit wall 22c in the shape of an upright wall which projects rearward is formed on the holder body 22a at a position to surround the shaft seating portion 22d and the periphery of the rotational shaft 50. In addition, the holder body 22a is provided with a pair of outer-peripheral engaging projections 22e and a pair of inner-peripheral engaging projections 22f which project forward and rearward, respectively, at different circumferential positions on the holder body 22a.

Figure 3:
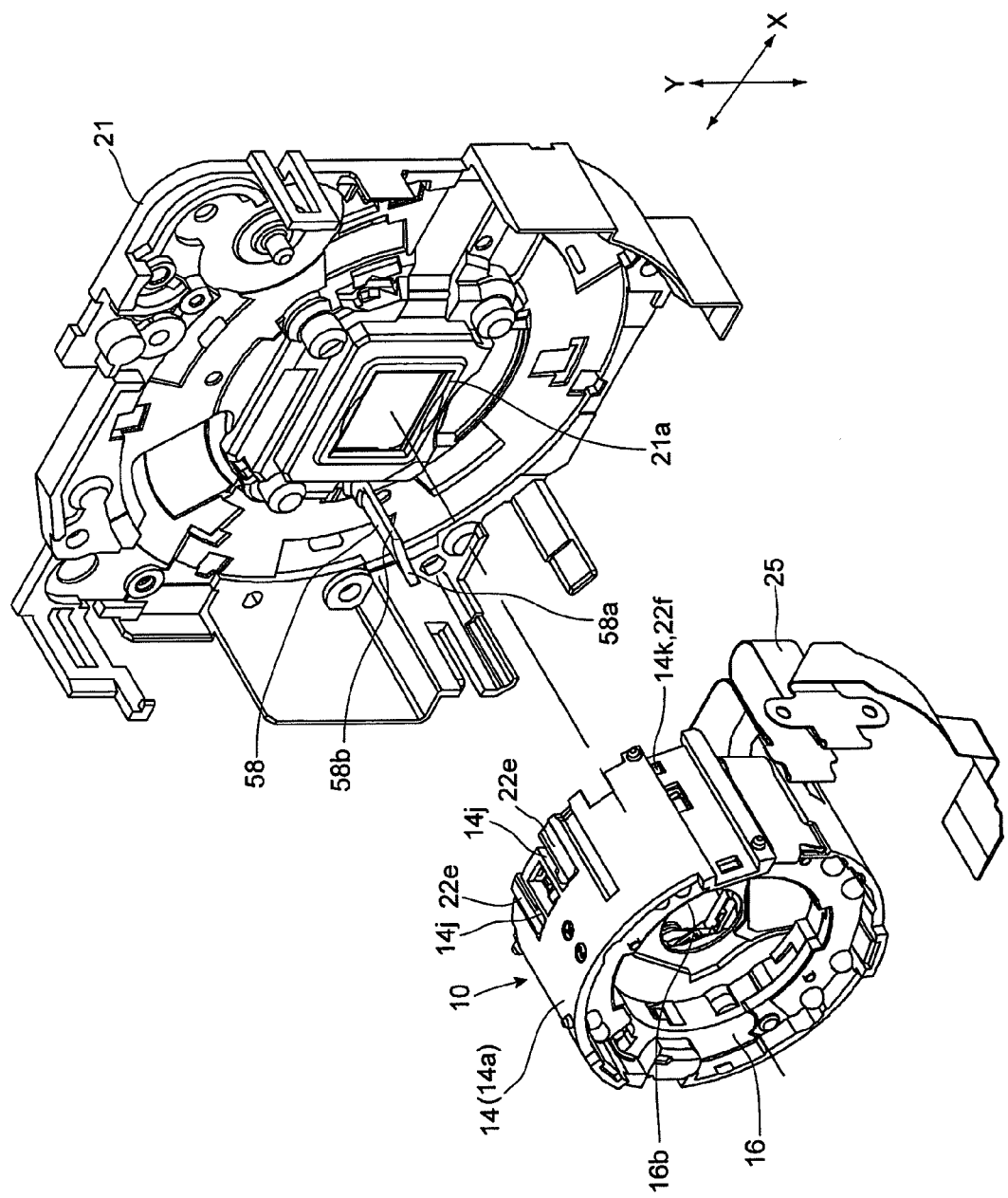
FIG. 3 is a front exploded perspective view of the anti-shake lens unit and an image sensor holder, showing a positional relationship therebetween.
Figure 6:
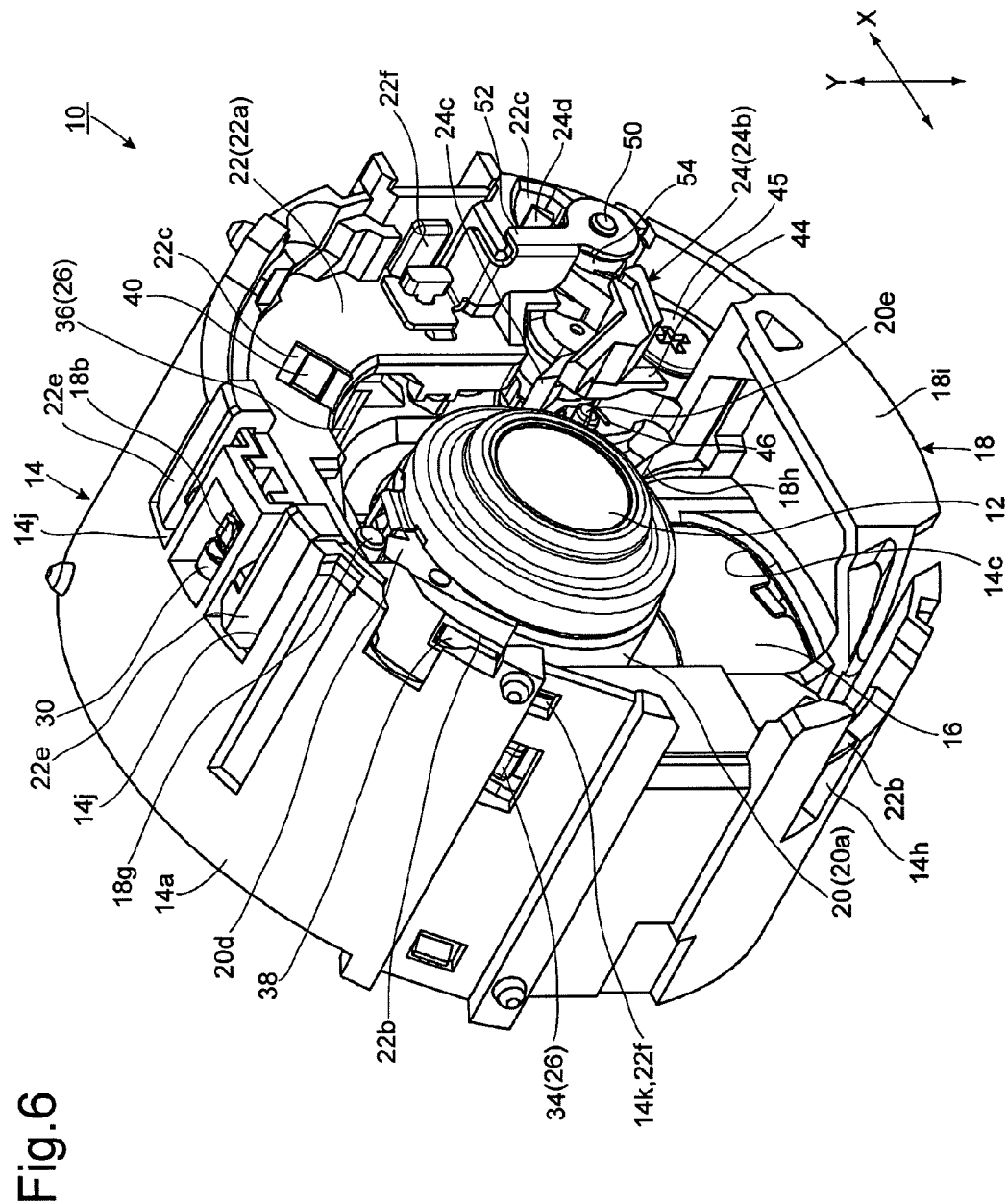
FIG. 6 is a rear perspective view of the anti-shake lens unit.

The linear moving ring 14 is provided at the rear end of the cylindrical portion 14a with two engaging recesses 14h and 14i in which the fitting lug 22b and the rotational limit wall 22c of the anti-shake sensor holder 22 can be engaged, respectively. In addition, the linear moving ring 14 is provided, on an outer peripheral surface of the cylindrical portion 14a in the vicinity of the rear end of the cylindrical portion 14a, with a pair of outer-peripheral engaging recesses 14j in which the pair of outer-peripheral engaging projections 22e are engageable, respectively. A pair of locking protrusions are provided in the pair of outer-peripheral engaging recesses 14j of the cylindrical portion 14a, respectively, while the pair of outer-peripheral engaging projections 22e are provided with a pair of locking protrusions which are engaged with the pair of locking protrusions in the pair of outer-peripheral engaging recesses 14j, respectively, to prevent the linear moving ring 14 and the anti-shake sensor holder 22 from separating (disengaging) from each other in the optical axis direction when the linear moving ring 14 and the anti-shake sensor holder 22 are engaged with each other as shown in FIGS. 3 and 6. Additionally, the cylindrical portion 14a is provided in the vicinity of the rear end thereof with a pair of engaging holes 14k, each of which is formed to extend radially through the cylindrical portion 14a. The anti-shake sensor holder 22 is provided, on the pair of inner-peripheral engaging projections 22f, with a pair of protrusions which protrudes radially outwards to be engageable in the pair of engaging holes 14k, respectively.

The holder body 22a of the anti-shake sensor holder 22 has an outer peripheral shape allowing the holder body 22a to be inserted into the cylindrical portion 14a of the linear moving ring 14, and the anti-shake sensor holder 22 is mounted to the linear moving ring 14 from behind with engaging portions (which will be discussed later) of the anti-shake sensor holder 22 aligned with associated engaging portions (which will be discussed later) of the linear moving ring 14 in the optical axis direction, respectively. The fitting lug 22b and the rotational limit wall 22c of the anti-shake sensor holder 22 are engaged in the engaging recesses 14h and 14i, respectively. The pair of outer-peripheral engaging projections 22e are inserted into the pair of outer-peripheral engaging recesses 14j until the aforementioned locking protrusions of the pair of outer-peripheral engaging projections 22e are engaged with the aforementioned locking protrusions of the pair of outer-peripheral engaging recesses 14j, respectively. The pair of inner-peripheral engaging projections 22f come in contact with an inner peripheral surface of the cylindrical portion 14a while the aforementioned pair of protrusions of the pair of inner-peripheral engaging projections 22f are engaged in the pair of engaging holes 14k of the linear moving ring 14, respectively. By the engagement of these engaging portions, the anti-shake sensor holder 22 is fixed to the linear moving ring 14 while being prevented from either rotating about the photographing optical axis O or moving in the optical axis direction relative to the linear moving ring 14 (see FIGS. 3, 6, 7 and 9). In this fixed state, the anti-shake sensor holder 22 can prevent the anti-shake frame 18 from coming off (coming loose) in a direction away from the inner wall 14b of the linear moving ring 14 (i.e., in the rearward direction). The insertion position of the anti-shake sensor holder 22 forwardly into the linear moving ring 14 in the optical axis direction is limited (determined) by making the front of the anti-shake sensor holder 22 abut against, e.g., an insertion limit portion (not shown) formed on the inner periphery of the linear moving ring 14, or the movement limit projections 14f. This abutting portion of the front of the anti-shake sensor holder 22 that abuts against the linear moving ring 14 in the optical axis direction includes the vicinity of the rotational limit wall 22c and the shaft seating portion 22d. Accordingly, the load applied to a portion of the anti-shake holder 22 in the vicinity of the rotational shaft 50 forwardly in the optical axis direction can be received by the linear moving ring 14.

The holder body 22a of the anti-shake sensor holder 22 is provided, at a position between the fitting lug 22b and the pair of outer-peripheral engaging projections 22e in the circumferential direction of the holder body 22a, with a sensor holding portion 22g, and is provided, at a position between the rotational limit wall 22c and the pair of outer-peripheral engaging projections 22e in the circumferential direction of the holder body 22a, with a sensor holding portion 22h. The sensor holding portions 22g and 22h hold two position detection sensors (detectors) 38 and 40 that are positioned behind the two permanent magnets 34 and 36 on the anti-shake frame 18, respectively. The position detection sensors 38 and 40 are connected to the flexible PWB 25, which extends from the shutter unit 16, and are also connected to the aforementioned control circuit board of the camera, in which the present embodiment of the anti-shake lens unit 10 is incorporated, via the aforementioned other flexible PWB (not shown) provided inside the lens barrel. The position detection sensors 38 and 40 are Hall sensors and can detect the position (drive position) of the anti-shake frame 18, which is driven by the anti-shake drive actuator 26, by converting variations of magnetic fields generated by the two permanent magnets 34 and 36 into electrical signals and outputting these electrical signals.

The anti-shake lens unit 10 is provided on the anti-shake frame 18 with the aforementioned insertable/removable frame 20. The insertable/removable frame 20 is supported by the anti-shake frame 18 to be rotatable (swingable) about a rotational shaft (first rotational shaft) 42 that extends parallel to the photographing optical axis O. The front end of the rotational shaft 42 is fixedly fitted into a shaft support hole 18f formed in the anti-shake frame 18, and the rear end of the rotational shaft 42 is fixed to a retaining member 44 fixed to the anti-shake frame 18. The insertable/removable frame 20 is provided with a cylindrical lens holder portion 20a, a shaft bearing portion 20b and an arm portion 20c. The cylindrical lens holder portion 20a holds the insertable/removable image-stabilizing lens 12, the rotational shaft 42 is inserted into the shaft bearing portion 20b, and the cylindrical lens holder portion 20a and the shaft bearing portion 20b are connected via the arm portion 20c. The insertable/removable frame 20 is swingable (rotatable) about the rotational shaft 42 between the insertion position shown in FIGS. 7 and 8 and the removed position shown in FIGS. 9 and 10, and the insertion position is defined by engagement of a stopper contact portion 20d formed on the cylindrical lens holder portion 20a with a stopper (an element of an insertion holder) 18g formed on the anti-shake frame 18. The insertable/removable frame 20 is biased toward the insertion position by an insertable/removable frame biasing spring (an element of the insertion holder/ inserting biaser) 46. The insertable/removable frame biasing spring 46 is configured of a torsion coil spring, the ends of which are hooked onto the anti-shake frame 18 and the insertable/removable frame 20, respectively. In addition, an optical-axis-direction biasing spring 48 configured of a compression spring is installed between the shaft bearing portion 20b and the retaining member 44, and the insertable/removable frame 20 is biased forward by the optical-axis-direction biasing spring 48 so that the position of the insertable/removable frame 20 in the optical axis direction is stabilized.

When the insertable/removable frame 20 is in the insertion position, the insertable/removable image-stabilizing lens 12 is positioned on the photographing optical axis O (in other words, so that the optical axis of the insertable/removable image-stabilizing lens 12 aligns with the photographing optical axis O). When the insertable/removable frame 20 rotates to the removed position in a state where the anti-shake frame 18 is at the movement limit thereof in the Y-axis direction (hereinafter referred to as the removal assisting position), in which the end of the inner wall of the movement limit holes 18c of the anti-shake frame 18 on the insertion position side (the upper end of the inner wall of each movement limit hole 18c with respect to FIGS. 8 and 10) comes into contact with the associated movement limit projection 14f, the center of the insertable/removable image-stabilizing lens 12 is displaced from the photographing optical axis O in the Y-axis direction. A clearance hole 18h, the shape of which corresponds to the path of movement of the cylindrical lens holder portion 20a that is defined by the arc-shaped path about the rotational shaft 42, is formed through the frame body 18a of the anti-shake frame 18, and the front end of the cylindrical lens holder portion 20a is positioned in the clearance hole 18h. The clearance hole 18h is open at (extends through) a portion of the outer periphery of the anti-shake frame 18, and a reinforcing bridge 18i is provided, on the anti-shake frame 18, over this opening portion. The reinforcing bridge 18i is offset rearwardly to be prevented from interfering with the cylindrical lens holder portion 20a when the insertable/removable frame 20 rotates to the removed position. As described above, the holder body 22a of the anti-shake sensor holder 22 is a partly-opened frame, which is open at an area between both circumferential ends of the holder body 22a and on which the fitting lug 22b and the shaft seating portion 22d are provided, and this opened portion of the holder portion 22a prevents the anti-shake sensor holder 22 from interfering with the reinforcing bridge 18i of the anti-shake frame 18.

As shown in FIGS. 8 and 10, the rotational shaft 50 is positioned in the vicinity of the rotational shaft 42 in a state where the anti-shake sensor holder 22 is mounted to the linear moving ring 14. The removal drive lever 24 is supported by the anti-shake sensor holder 22 to be rotatable (swingable) about the rotational shaft 50 between an insertion allowance position shown in FIGS. 7 and 8 and a forced removing position shown in FIGS. 9 and 10. The rotational shaft 50 is inserted into a shaft hole formed through a shaft bearing portion 24a of the removal drive lever 24. A retaining plate 52 is fixed to the rear of the shaft seating portion 22d, and the removal drive lever 24 is prevented from moving in the forward/rearward direction with respect to the anti-shake sensor holder 22 due to being held between the shaft seating portion 22d and the retaining plate 52. The fixation position of the retaining plate 52 is determined by making the rear end of the rotational shaft 50 engaged in a hole formed through the retaining plate 52 (see FIGS. 4 and 5) and by the retaining plate 52 contacting a wall portion on the anti-shake sensor holder 22 which is continuous with the rotational limit wall 22c. The removal drive lever 24 is provided with an arm portion 24b which extends radially from the shaft bearing portion 24a and is further provided in the vicinity of the free end of the arm portion 24b with a removal pressing portion 24c that is capable of coming into contact with a pressing-force receiving portion 20e formed on the arm portion 20c of the insertable/removable frame 20. The removal pressing portion 24c has a flat surface which extends outwardly in a radial direction of rotation of the removal drive lever 24. This flat surface of the removal pressing portion 24c faces the pressing-force receiving portion 20e. The pressing-force receiving portion 20e is formed as an outer peripheral surface of a cylindrical projection, the axis of which extends parallel to the optical axis O and faces the aforementioned flat surface of the removal pressing portion 24c. Therefore, the positional relationship between the removal pressing portion 24c and the pressing-force receiving portion 20e is such that no force in a direction parallel to the photographing optical axis O is transmitted from the removal drive lever 24 to the insertable/removable frame 20, whereas a force in a rotational direction is transmitted from the removal drive lever 24 to the insertable/removable frame 20. The removal drive lever 24 is further provided with a pressing-force receiving portion 24d which projects radially outwards from the shaft bearing portion 24a.

Figure 7:
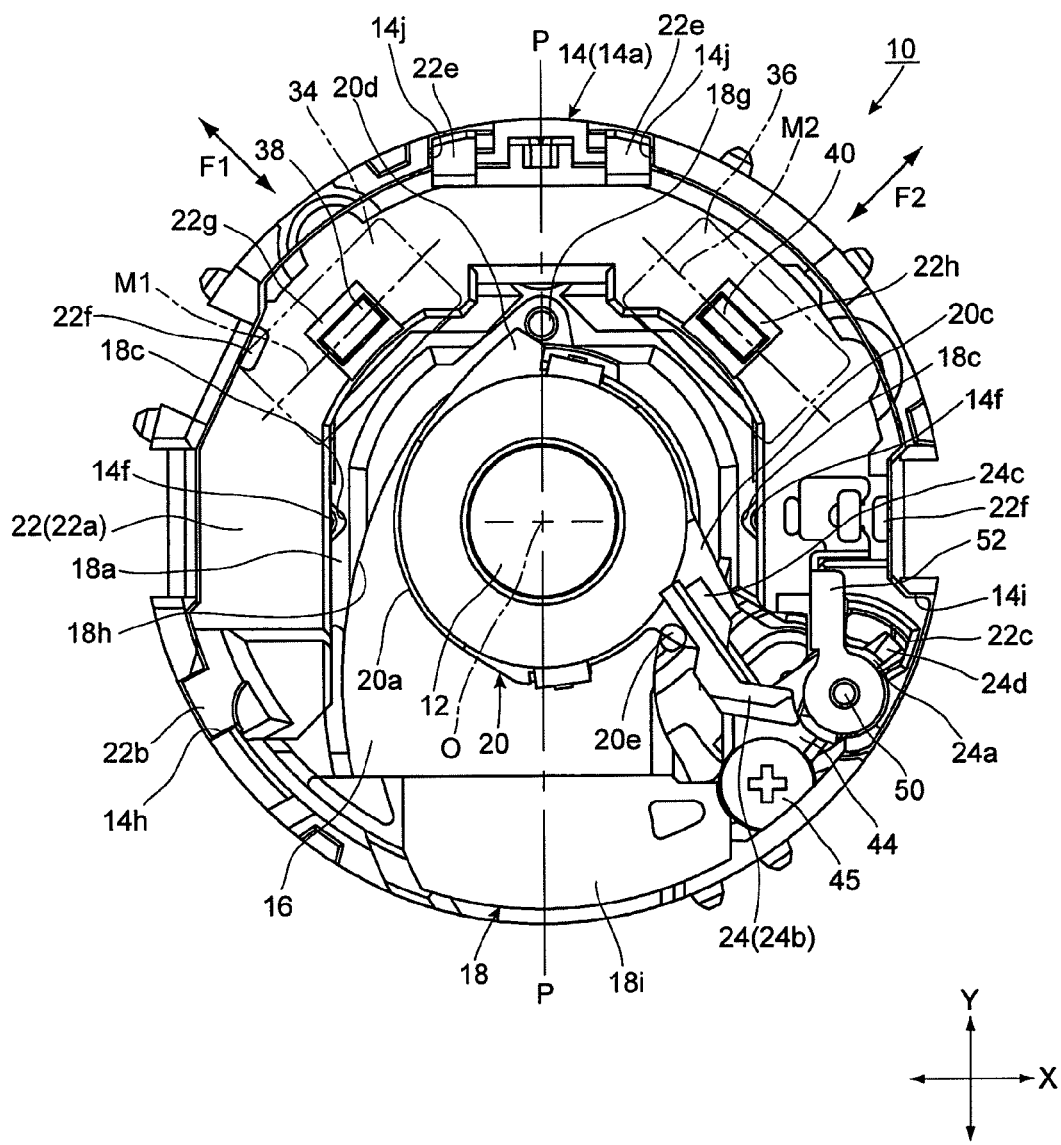
FIG. 7 is a rear elevational view of the major components of the anti-shake lens unit in a ready-to-photograph state, viewed from the image plane side.

The biasing force of the aforementioned insertable/removable frame biasing spring 46 urges the insertable/removable frame 20 so that the insertable/removable frame 20 rotates toward the insertion position from the removed position (clockwise direction with respect to FIGS. 7 through 10), and the removal drive lever 24 is also biased to rotate in the same direction (clockwise direction with respect to FIGS. 7 through 10) toward the insertion allowance position by a removal drive lever biasing spring (an element of an insertion/removal controller/insertion allowing biaser) 54. The rotational limit wall 22c functions as a stopper which determines the rotational limit of the removal drive lever 24 in the biasing direction of the removal drive lever biasing spring 54, i.e., the insertion allowance position of the removal drive lever 24. In determining the insertion allowance position of the removal drive lever 24, a portion of the pressing-force receiving portion 24d comes in contact with an inner surface of the rotational limit wall 22c. On the other hand, rotation of the insertable/removable frame 20 in the biasing direction of the insertable/removable frame biasing spring 46 is limited by engagement of the stopper contact portion 20d with the stopper 18g. FIGS. 7 and 8 show a state where the insertable/removable frame 20 and the removal drive lever 24 are in contact with the stopper 18g and the aforementioned stopper (i.e., the rotational limit wall 22c) of the linear moving ring 14, respectively, and at this stage the pressing-force receiving portion 20e and the removal pressing portion 24c are spaced from each other. The clearance between the pressing-force receiving portion 20e and the removal pressing portion 24c is determined to be a degree such as to prevent the pressing-force receiving portion 20e from coming in contact with the removal pressing portion 24c during the moving range of the anti-shake frame 18 relative to the shutter unit 16 (i.e., the aforementioned range until the movement limit projections 14f come into contact with the inner walls of the two movement limit holes 18c, respectively). In other words, when in the insertion allowance position, the removal drive lever 24 does not interfere with either the anti-shake driving operations of the anti-shake frame 18 or the insertable/removable frame 20, which are performed by the anti-shake drive actuator 26. If no external force is exerted on the insertable/removable frame 20 and the removal drive lever 24, the state shown in FIGS. 7 and 8, in which the insertable/removable frame 20 is held in the insertion position by the biasing force of the insertable/removable frame biasing spring 46, is maintained.

As shown in FIG. 3, the lens barrel is provided therein behind the anti-shake lens unit 10 with an image sensor holder (stationary member) 21. The image sensor holder 21 is a stationary (immovable) member and holds an image sensor (image pickup device) in an image sensor holding portion 21a of the image sensor holder 21. The image sensor holder 21 is provided, in the vicinity of the image sensor holding portion 21a on one of the laterally opposite sides of the image sensor holding portion 21a, with an insertion/removal control-projection (an element of the insertion/removal controller/ component force imparting member) 58. The insertion/removal control-projection 58 projects forward and is provided at the front end thereof with an end-face cam 58a and is further provided, on a side of the insertion/removal control-projection 58 which is continuous with the end-face cam 58a, with a removed-lens holding surface 58b which extends substantially parallel to the optical axis O. The insertion/removal control-projection 58 can be provided on any arbitrary element of the lens barrel other than the image sensor holder 21.

The insertion/removal control-projection 58 is positioned behind the removal drive lever 24 when the lens barrel is in a ready-to-photograph state, and a retracting movement of the linear moving ring 14 causes the removal drive lever 24 to approach the insertion/removal control-projection 58 when the lens barrel moves to the lens barrel accommodated state. A further retracting movement of the linear moving ring 14 (i.e., rearward moving force of the linear moving ring 14 in the optical axis direction) causes the pressing-force receiving portion 24d of the removal drive lever 24 to come into contact with the end-face cam 58a and subsequently causes a component force which makes the removal drive lever 24 rotate in a direction against the biasing force of the removal drive lever biasing spring 54 (in a direction toward the forced removing position from the insertion allowance position of the removal drive lever 24), so that the removal drive lever 24 solely rotates by an amount of rotation corresponding to the aforementioned clearance, which causes the removal pressing portion 24c to come into contact with the pressing-force receiving portion 20e of the insertable/removable frame 20. Thereupon, the pressing force in the direction toward the removed position of the insertable/removable frame 20 is transmitted to the insertable/removable frame 20 via the removal pressing portion 24c and the pressing-force receiving portion 20e, which causes the removal drive lever 24 to press and rotate the insertable/removable frame 20 toward the removed position against the biasing forces of both the insertable/removable frame biasing spring 46 and the removal drive lever biasing spring 54. After the insertable/removable frame 20 reaches the removed position, the removed-lens holding surface 58b of the insertion/removal control-projection 58 is engaged with a side of the pressing-force receiving portion 24d, so that the removal drive lever 24 is held in the forced removing position; consequently, the insertable/removable frame 20 is held in the removed position (see FIGS. 9 and 10).

Operations of the anti-shake lens unit 10 that has the above described structure will be discussed hereinafter. In a ready-to-photograph state shown in FIGS. 7 and 8, the insertable/removable frame 20 is held at the insertion position by the biasing force of the insertable/removable frame biasing spring 46, and the center (optical axis) of the insertable/removable image-stabilizing lens 12 is coincident with the photographing optical axis O. In addition, the removal drive lever 24 is held at the insertion allowance position by the biasing force of the removal drive lever biasing spring 54. In this ready-to-photograph state, deviations (image shake) of an object image on the image plane can be reduced by moving the insertable/removable image-stabilizing lens 12 with respect to the photographing optical axis O by driving the anti-shake frame 18 in a plane (first plane) orthogonal to the photographing optical axis O by the anti-shake drive actuator 26 in accordance with the direction and magnitude of vibrations applied to the lens barrel (i.e., to the photographing optical system). More specifically, the angular velocities of the lens barrel are detected by gyro sensors (not shown) incorporated in the camera, in which the present embodiment of the anti-shake lens unit 10 is incorporated, and are time-integrated to determine a moving angle, and subsequently, from this moving angle, the moving amounts of the image on the focal plane are calculated while the driving amounts and the driving directions of the insertable/removable image-stabilizing lens 12 (the anti-shake frame 18) are calculated in order to cancel out the image shake. Subsequently, the passage of current through each of the coils 31 and 32 is controlled in accordance with the calculated values. Thereupon, the anti-shake frame 18 is moved while being supported by the three guide balls 28 at three ball contact surfaces on the front of the frame body 18a of the anti-shake frame 18. When the anti-shake frame 18 is driven to perform an anti-shake driving operation, the insertable/removable frame 20 is held in the insertion position, in which the stopper contact portion 20d is made to contact the stopper 18g, so that the anti-shake frame 18 and the insertable/removable frame 20 (the insertable/removable image-stabilizing lens 12) integrally move. Since a clearance is provided between the pressing-force receiving portion 20e and the removal pressing portion 24c as described above, the removal drive lever 24 does not restrict the anti-shake driving operation of the anti-shake frame 18 together with the insertable/removable frame 20 that is performed by the anti-shake drive actuator 26.

In a ready-to-photograph state, it is possible to calibrate the position detection sensors 38 and 40 by utilizing information on the positions of movement limits of the anti-shake frame 18, where each of the two movement limit projections 14f comes into contact with the inner wall of the associated movement limit hole 18c of the anti-shake frame 18. The direction of action of each of the two driving forces F1 and F2, which are respectively generated by a combination of the coil 31 and the permanent magnet 34 and a combination of the coil 32 and the permanent magnet 36, intersects both the X-axis direction and the Y-axis direction at an angle of approximately 45 degrees. Accordingly, the movement limits of each movement limit hole 18c in the X-axis direction relative to the associated movement limit projection 14f (defined by each laterally opposed corner (end) of each movement limit hole 18c coming into contact with the associated movement limit projection 14f) can be used as reference positions for driving the anti-shake frame 18 in the X-axis direction by the anti-shake drive actuator 26, and the movement limits of each movement limit hole 18c in the Y-axis direction relative to the associated movement limit projection 14f (defined by each vertically opposed corner (end) of each movement limit hole 18c coming into contact with the associated movement limit projection 14f) can be used as reference positions for driving the anti-shake frame 18 in the Y-axis direction by the anti-shake drive actuator 26. A practical anti-shake driving range of the anti-shake frame 18 in a ready-to-photograph state is defined within a range in which each movement limit projection 14f does not come into contact with the inner wall of the associated movement limit hole 18c.

When the lens barrel moves from a ready-to-photograph state to the lens barrel accommodated state, the anti-shake lens unit 10 (the linear moving ring 14) is moved rearward in the optical axis direction by a motor (not shown) for driving the entire lens barrel forward and rearward, and the pressing-force receiving portion 24d of the removal drive lever 24 which retracts with the linear moving ring 14 comes in contact with the end-face cam 58a of the insertion/removal control-projection 58. A further rearward movement of the linear moving ring 14 causes the pressing-force receiving portion 24d to be pressed by the end-face cam 58a. Thereupon, a component force is produced from the retracting force of the linear moving ring 14, so that the removal drive lever 24 is rotated toward the forced removing position from the insertion allowance position against the biasing force of the removal drive lever biasing spring 54 to thereby cause the removal pressing portion 24c to come into contact with the pressing-force receiving portion 20e. The insertable/removable frame 20 is acted upon by a biasing force of the insertable/removable frame biasing spring 46 toward the insertion position as described above, and the removal drive lever 24 with the removal pressing portion 24c in contact with the pressing-force receiving portion 20e presses the insertable/removable frame 20 toward the removed position from the insertion position against the biasing force of the insertable/removable frame biasing spring 46. In addition, the anti-shake frame 18, which supports the insertable/removable frame 20, is acted upon by the biasing force of the three extension springs 30 in a direction to press the three ball contact surfaces 18a against the three guide balls 28. Namely, the insertable/removable frame biasing spring 46 and the extension spring 30 exert spring resistance on movements of the insertable/removable frame 20 and the anti-shake frame 18, respectively. Here the rotational resistance of the insertable/removable frame 20 that is caused by the insertable/removable frame biasing spring 46 is predetermined to be greater than the resistance to movement of the anti-shake frame 18 that is caused by the extension spring 30. Therefore, the pressing force acting on the insertable/removable frame 20 is transmitted to the anti-shake frame 18, thus causing the anti-shake frame 18 to move with the insertable/removable frame 20 toward the removed position before the commencement of rotation of the insertable/removable frame 20 toward the removed position. Subsequently, the anti-shake frame 18 is moved to the removal assisting position (shown in FIGS. 9 and 10), in which the end of the inner wall of each of the two movement limit holes 18c of the anti-shake frame 18 on the insertion position side in the Y-axis direction comes into contact with the associated movement limit projection 14f. Since the aforementioned practical anti-shake driving range of the anti-shake frame 18 in a ready-to-photograph state includes no points where the inner wall of each movement limit hole 18c comes into contact with the associated movement limit projection 14f as described above, the removal assisting position is positioned outside the practical anti-shake driving range. Immediately after the anti-shake frame 18 is prevented from moving beyond the removal assisting position after reaching the removal assisting position, the insertable/removable frame 20 is solely rotated from the insertion position to the removed position. Accordingly, the movement of the insertable/removable image-stabilizing lens 12 to the removed position thereof is performed as the result of a combination of the movement of the anti-shake frame 18 to the removal assisting position in the Y-axis direction and the rotation of the insertable/removable frame 20 to the removed position relative to the anti-shake frame 18.

Figure 9:
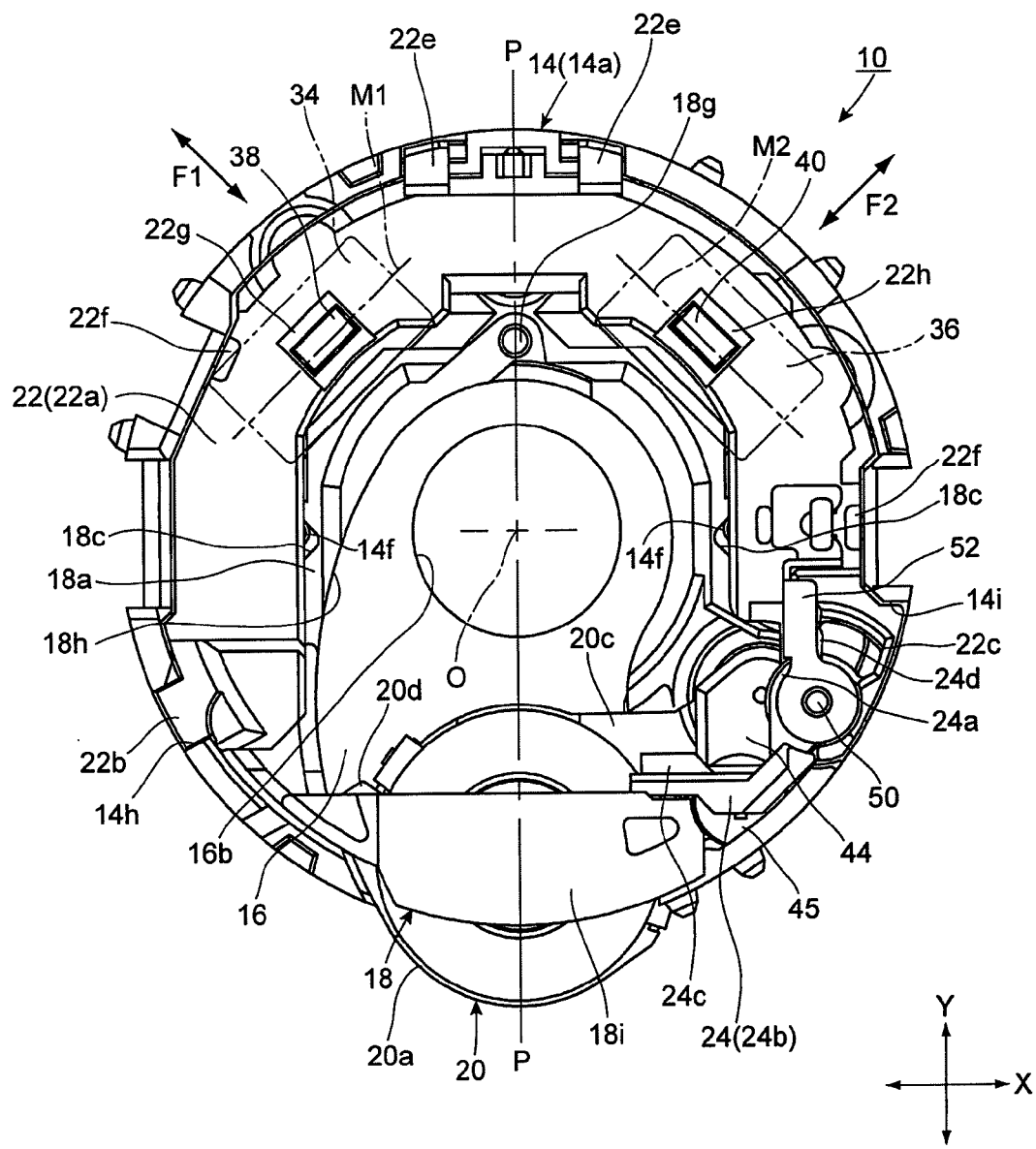
FIG. 9 is a rear elevational view of the major components of the anti-shake lens unit in a lens barrel accommodated state, viewed from the image plane side.

The insertable/removable image-stabilizing lens 12 is removed from a position on an optical path (the photographing optical axis O), as shown in FIGS. 9 and 10, due to the movement of the anti-shake frame 18 to the removal assisting position and the rotation of the insertable/removable frame 20 to the removed position. A further rearward movement of the linear moving ring 14 causes the removed-lens holding surface 58b of the insertion/removal control-projection 58 to come in contact with the pressing-force receiving portion 24d of the removal drive lever 24, thereby holding the removal drive lever 24 in the forced removing position (see FIG. 9), so that the insertable/removable frame 20 together with the removal drive lever 24 is held in the removed position by the insertion/removal control-projection 58 and is prevented from rotating toward the insertion position. Although not shown in the drawings, upon the lens barrel reaching the lens barrel accommodated state, a member positioned behind the insertable/removable image-stabilizing lens 12 (e.g., an optical element other than the insertable/removable image-stabilizing lens 12 which is positioned behind the insertable/removable image-stabilizing lens 12 in a ready-to-photograph state) enters an open space in the linear moving ring 14 which is created by the removal of the insertable/removable image-stabilizing lens 12 (the cylindrical lens holder portion 20a). Accordingly, this structure makes it possible to reduce the length of the lens barrel in the optical axis direction in the lens barrel accommodated state of the lens barrel to a smaller degree than a type of lens barrel in which a plurality of optical elements are retracted and accommodated in line along the optical axis thereof.

Conversely, when the lens barrel moves from the lens barrel accommodated state to a ready-to-photograph state, the linear moving ring 14 is moved forward to thereby release the pressing force of the insertion/removal control-projection 58 against the removal drive lever 24 (i.e., release the holding of the removal drive lever 24 in the forced removing position), which causes the removal drive lever 24 to return to the insertion allowance position shown in FIGS. 7 and 8 by the biasing force of the removal drive lever biasing spring 54. Thereupon, the biasing force of the insertable/removable frame biasing spring 46 causes the insertable/removable frame 20 to rotate from the removed position to the insertion position. In association with this rotation, the holding of the anti-shake frame 18 in the removal assisting position is also released, which brings the anti-shake frame 18 into a state where it can be driven by the anti-shake drive actuator 26. Thereafter, upon the lens barrel moving to a ready-to-photograph state, the aforementioned calibration operation for the position detection sensors 38 and 40 is performed.

In the anti-shake lens unit 10, the removal drive lever 24 is supported by the anti-shake sensor holder 22, which is fixed with respect to the linear moving ring 14, separately from the insertion/removal frame 20 that support the insertable/removable image-stabilizing lens 12 and the anti-shake frame 18, and the removal drive lever 24 is moved to the forced removing position by pressing the removal drive lever 24 by the insertion/removal control-projection 58 to press and move the insertion/removal frame 20 to the removed position via the removal drive lever 24 when the lens barrel moves from a ready-to-photograph state to the lens barrel accommodated state. Since the removal drive lever 24 is pivotally supported by the rotational shaft 50, which is parallel to the rotational shaft 42 of the insertion/removal frame 20 and is rotated on a plane (second plane) orthogonal to the photographing optical axis O, the region to which the load in the optical axis direction is applied only extends until the removal drive lever 24, and no load in the optical axis direction is imposed on the insertion/removal frame 20 or the anti-shake frame 18. Since the removal pressing portion 24c and the pressing-force receiving portion 20e are formed as surfaces having shapes that do not transmit any force in a direction parallel to the photographing optical axis O as described above, the insertion/removal frame 20 is not pressed in a direction along the axis of the rotational shaft 42 even if the removal drive lever 24 which has been pressed by the insertion/removal control-projection 58 slightly moves in a direction along the axis of the rotational shaft 50. This lightens (reduces) the load on the support mechanism for the insertion/removal frame 20 and the anti-shake frame 18 and ensures a high-precision driving of the insertable/removable image-stabilizing lens 12. Specifically, when the removal drive lever 24 is pressed by the insertion/removal control-projection 58, no excessive loads in the optical axis direction are applied to the guide balls 28, which are held between the ball contact surfaces on the anti-shake frame 18 (the bottom surfaces of the three ball support holes 18s) and the ball contact surfaces on the linear moving ring 14 (the bottom surfaces of the three ball support holes 14g), and accordingly, there is no possibility of the guide balls 28 making dents on the ball contact surfaces on the anti-shake frame 18 or the ball contact surfaces on the linear moving ring 14.

In addition, since the anti-shake lens unit 10 is structured such that the pressing force in the optical axis direction that is caused by the insertion/removal control-projection 58 does not directly act on the insertable/removable frame 20 or the anti-shake frame 18 due to the installation of the removal drive lever 24 between the insertable/removable frame 20 and the insertion/removal control-projection 58, the biasing force of the extension spring 30, which is for holding the guide balls 28 between the anti-shake frame 18 and the linear moving ring 14, can be set without taking into account the load fluctuations in the pressing force caused by the insertion/removal control-projection 58. More specifically, the load on the anti-shake driving actuator 26 that drives the anti-shake frame 18 becomes great if the biasing force of the extension spring 30 is too strong, and the guide balls 28 may fall out if the biasing force of the extension spring 30 is too small; accordingly, one only needs to determine the biasing force of the extension spring 30 while considering the balance of the biasing force of the extension spring 30. Unlike the present embodiment of the anti-shake lens unit 10, if an anti-shake lens unit were to be structured such that the pressing force in the optical axis direction that is caused by the insertion/removal control-projection 58 acting on the anti-shake frame 18, the biasing force of the extension spring 30 which is set in the above manner would become unbalanced; however, such a problem can be prevented from occurring according to the structure of the present embodiment.

In addition, unlike the insertion/removal frame 20 that varies the position of the rotational shaft 42 in accordance with movement of the anti-shake frame 18, the removal drive lever 24 which is pressed by the insertion/removal control-projection 58 can maintain a constant positional relationship between the removal drive lever 24 and the insertion/removal control-projection 58 without being influenced by the moving position of the anti-shake frame 18 because the removal drive lever 24 is supported by the rotational shaft 50 of the anti-shake sensor holder 22, the position of which with respect to the linear moving ring 14 does not vary. Hence, the relative position between the pressing-force receiving portion 24d of the removal drive lever and the end-face cam 58a of the insertion/removal control-projection 58 does not vary, so that the removal drive lever 24 can be driven with high precision. Since the contacting area between the removal drive lever 24 and the insertion/removal frame 20 is established by the removal pressing portion 24c, which is a flat surface extending in a radial direction of rotation of the removal drive lever 24, and the pressing-force receiving portion 20e, which is an outer peripheral surface of a cylindrical projection as described above, the removal pressing portion 24c can be brought into contact securely with the pressing-force receiving portion 20e to make the insertion/removal frame 20 rotate to the removed position even if the position of the insertion/removal frame 20 varies by movements of the anti-shake frame 18 which are performed to reduce image shake.

In addition, the removal drive lever 24 being indirectly supported by the linear moving ring 14 via the anti-shake sensor holder 22 rather than being supported directly by the linear moving ring 14 is another characteristic feature of the present invention. The rotational shaft 50, which supports the removal drive lever 24, is required not to vary the position thereof with respect to the insertion/removal control-projection 58 in a plane orthogonal to the photographing optical axis O. Accordingly, the anti-shake frame 18 is unsuitable for use as a member onto which the rotational shaft 50 is provided. In addition, since the removal drive lever 24 is brought into contact with, and driven by, the insertion/removal control-projection 58 which is positioned behind the removal drive lever 24 in accordance with rearward movement (movement toward the image plane) of the linear moving ring 14, no other members can be placed at a position cutting in between the removal drive lever 24 and the insertion/removal control-projection 58. On the other hand, as shown in FIGS. 6, 7 and 9, when the linear moving ring 14 is viewed from the image plane side, the space behind the inner wall 14b is almost covered by the anti-shake frame 18, so that there is no room to provide the inner wall 14b thereon with a portion corresponding to the rotational shaft 50 which supports the removal drive lever 24. To provide such a member corresponding to the rotational shaft 50 on the linear moving ring 14 at a position that does not interfere with the anti-shake frame 18 and the anti-shake sensor holder 22, the linear moving ring 14 is assumed to be provided, in the vicinity of the rear end of the cylindrical portion 14a, with a radial projection which projects radially outward or inwards and further provided with a rotational shaft which projects toward the image plane side from such a radial projection. However, in the case of providing the linear moving ring 14 with a projection which projects radially outwards, the anti-shake lens unit 10 that includes the linear moving ring 14 increases in size. In addition, in the case of providing the linear moving ring 14 with a projection which projects radially inwards, it is difficult to produce the linear moving ring 14 (specifically, it is difficult to produce a die for molding the linear moving ring 14) using a resin molding technique which is generally used in production of an element of a lens barrel such as the linear moving ring 14, which may increase the production cost. Even if produced in such a manner, the linear moving ring 14 results in having a shape blocking the entering path of the anti-shake frame 18 and/or the anti-shake sensor holder 22 into the linear moving ring 14, which may impose limitations to the mounting direction of the parts. Additionally, if the rotational shaft 50 that supports the removal drive lever 24 is positioned excessively far away from the rotational axis 42 that supports the insertable/removable frame 20, the removal drive lever 24 becomes great in size, which may produce a deteriorated condition in space utilization and driving force transmission efficiency.

Although the above described conditions and constraints exist for the support of the removal drive lever 24, in the anti-shake lens unit 10 of the present embodiment providing the rotational shaft 50 on the anti-shake sensor holder 22 rather than the linear moving ring 14 makes it possible to resolve the above-mentioned problems while satisfying requirements for driving the removal drive lever 24. First, since the anti-shake sensor holder 22 is a member which is fixed to the linear moving ring 14 after being made separately from the linear moving ring 14, the rotational shaft 50 can be provided with no increase in size of the linear moving ring 14 and without the linear moving ring 14 being formed into a complicated shape. The rotational shaft 50 of the anti-shake sensor holder 22 can be easily molded using a die that can be split in the forward/rearward direction (in the optical axis direction in a completed state of the anti-shake lens unit 10), thus making it possible to achieve a reduction of the production cost. In addition, since the anti-shake sensor holder 22 is a member which is fixed to the linear moving ring 14 to be positioned behind the frame body 18a of the anti-shake frame 18, the rotational shaft 50 can be arranged at a position superposing the frame body 18a of the anti-shake frame 18 as viewed from the image plane side, so that the rotational shaft 50 can be easily arranged at an optimum position with respect to the positions of the insertable/removable frame 20 and the rotational shaft 42 thereof. Namely, the degree of freedom in location of the rotational shaft 50 and the removal drive lever 24 is high.

Additionally, the removal drive lever biasing spring 54 that biases the removal drive lever 24 to rotate the removal drive lever 24 toward the insertion allowance position is installed onto the anti-shake sensor holder 22, and the rotational limit wall 22c that determines the rotational limit of the removal drive lever 24 in the biasing direction of the removal drive lever biasing spring 54 (i.e., the insertion allowance position of the removal drive lever 24) is also provided on the anti-shake sensor holder 22. Accordingly, the support structure for the removal drive lever 24 is completed solely by the anti-shake sensor holder 22, so that the anti-shake sensor holder 22 and the removal drive lever 24 can be unitized and handled as a unit, which contributes to an improvement in productivity.

When the removal drive lever 24 is rotated via the insertion/removal control-projection 58 from the insertion allowance position to the forced removing position, a forward pressing force is exerted on the removal drive lever 24 via the pressing-force receiving portion 24d; however, the removal drive lever 24 is prevented from moving forward by making the front end of the shaft bearing portion 24a engaged with the shaft seating portion 22d of the anti-shake sensor holder 22. In addition, the anti-shake sensor holder 22 abuts against the aforementioned insertion limit portion (not shown), which is formed on the inner periphery of the linear moving ring 14, at a portion of the front of the anti-shake sensor holder 22 in the vicinity of the shaft seating portion 22d. Accordingly, the shaft seating portion 22d of the anti-shake sensor holder receives the pressing force of the insertion/removal control-projection 58 against the removal drive lever 24 and transmits this load to the linear moving ring 14. In addition, the rotational limit wall 22c, which is adjacent to the shaft seating portion 22d and surrounds the rotational shaft 50, is formed on the anti-shake sensor holder 22, and this formation of the rotational limit wall 22c increases the cross-section strength of a portion of the anti-shake sensor holder 22 in the vicinity of the shaft seating portion 22d. Accordingly, the rotational limit wall 22c functions as not only a portion which prevents the removal drive lever 24 from rotating when the removal drive lever 24 is in the insertion allowance position but also as a reinforcing portion around the shaft seating portion 22d. Due to these configurations, even if a strong load acts on the removal drive lever 24 from the insertion/removal control-projection 58, the anti-shake sensor holder 22 in the vicinity of the shaft seating portion 22d is not easily deformed, so that the removal drive lever 24 can be supported with precision.

Although the present invention has been discussed with reference to the above described embodiment, the present invention is not limited thereto. For instance, although the anti-shake sensor holder 22 that supports the removal drive lever 24 is capable of holding the position detection sensors 38 and 40 and capable of serving as a retaining member which prevents the anti-shake frame 18 from coming off (becoming loose) rearwardly, in an embodiment according to the present invention, it is possible that a member from which either one of, or both of these two capabilities are omitted can be made to serve as the rear support member.

In addition, the anti-shake frame 18, which carries out the moving operation for image shake correction, is supported by the guide balls 28 to be freely movable along a plane orthogonal to the photographing optical axis O, while the insertion/removal frame 20 is a rotatable (swingable) member which is pivotally supported by the anti-shake frame 18 thereon via the rotational shaft 42 in the above illustrated embodiment; however, the anti-shake frame 18 and the insertion/removal frame 20 can be replaced by a first movable stage and a second movable stage which are linearly movable along the X-axis direction and the Y-axis direction, respectively. In this modified embodiment, it is recommendable that the permanent magnets 34 and 36 of the anti-shake driving actuator 26 be supported by the second movable stage and that image shake be corrected by movements (deviations) of a combination of the first movable stage and the second movable stage.

Although the inner wall 14b of the linear moving ring 14 that supports the anti-shake frame 18 with the guide balls 28 held between the inner wall 14b and the anti-shake frame 18 in the above illustrated embodiment, a structure other than the structure in which the linear moving ring 14 directly supports the anti-shake frame 18 is possible. For instance, it is possible to remove the inner wall 14b from the linear moving ring 14 so that the rear of the shutter unit 16 faces the anti-shake frame 18 and supports the anti-shake frame 18 in a manner to allow the anti-shake frame 18 to move (portions corresponding to the movement limit projections 14f and the ball support holes 14g can be formed on the rear of the shutter unit 16).

Although the anti-shake frame 18 is moved to the removal assisting position to increase the removing amount of the insertable/removable frame 20 when the insertable/removable frame 20 is moved to the removed position (the insertable/removable image-stabilizing lens 12 can be made to be removed from the photographing optical axis O by a small amount of movement of the insertable/removable frame 20) in the above illustrated embodiment, the present invention can also be applied to an optical apparatus in which an anti-shake frame corresponding to the anti-shake frame 18 does not perform such a supplemental moving operation in a direction away from a photographing optical axis.

Additionally, the above illustrated embodiment of the anti-shake lens unit is provided with a three guide balls 28 and three extension springs 30 between the linear moving ring 14 and the anti-shake frame 18; however, the number of the anti-shake guide member (corresponding to the guide balls 28) and the holding biaser (corresponding to extension springs 30) are not limited solely to these specific numerals. For instance, it is possible to provide two or more of the anti-shake guide members. Similarly, it is possible to provide two or more of the holding biasers.

Obvious changes may be made in the specific embodiment of the present invention described herein, such modifications being within the spirit and scope of the invention claimed. It is indicated that all matter contained herein is illustrative and does not limit the scope of the present invention.

What is claimed is:

1. A position controller for an optical element, provided in a photographing optical system which moves between a ready-to-photograph state and an accommodated state in which no pictures are taken, said position controller comprising:
    an advancing/retracting ring which is movable in an optical axis direction of said photographing optical system, wherein said advancing/retracting ring is moved between a first position at which said photographing optical system is in said ready-to-photograph state and a second position at which said photographing optical system is in said accommodated state;
    an anti-shake moving member which is supported by said advancing/retracting ring therein to be movable along a first plane orthogonal to said optical axis;
    an insertable/removable moving member which holds said optical element and is supported by said anti-shake moving member to be movable between an insertion position in which said optical element is positioned on said optical axis and a removed position in which said optical element is removed from said optical axis;
    an insertion holder which holds said insertable/removable moving member in said insertion position when said photographing optical system is in said ready-to-photograph state;
    a rear support member which is fixed to said advancing/retracting ring at a position closer to the image plane than said anti-shake moving member, with respect to the optical axis;
    a removal drive member which is supported by said rear support member to be movable along a second plane orthogonal to said optical axis between an insertion allowance position in which said removal drive member is in noncontact with said insertable/removable moving member in said insertion position, to thereby allow said anti-shake moving member to move in a moving range thereof, and a forced removing position in which said removal drive member comes in contact with and presses said insertable/removable moving member to move said insertable/removable moving member from said insertion position to said removed position; and
    an insertion/removal controller which holds said removal drive member in said insertion allowance position when said photographing optical system is in said ready-to-photograph state, and moves said removal drive member from said insertion allowance position to said forced removing position when said advancing/retracting ring moves from said first position to said second position.

2. The position controller according to claim 1, further comprising an anti-shake driver which drives said anti-shake moving member in said first plane to perform an image-stabilizing operation in accordance with vibrations applied to said photographing optical system,
    wherein said rear support member is provided with a detector which detects a position of said anti-shake moving member that is driven by said anti-shake driver.

3. The position controller according to claim 1, wherein said insertable/removable moving member is pivotally supported by said anti-shake moving member to be rotatable about a first rotational shaft that is parallel to said optical axis, and
    wherein said removal drive member is pivotally supported by said rear support member to be rotatable about a second rotational shaft that is parallel to said first rotational shaft.

4. The position controller according to claim 3, wherein said rear support member comprises a rotational limit wall, around said second rotational shaft, which comes into contact with said removal drive member to prevent said removal drive member from further rotating when said removal drive member rotates from said forced removing position to said insertion allowance position.

5. The position controller according to claim 3, wherein said rear support member is formed as a partly-opened frame surrounding said optical axis which has a circumferential opening in a circumferential direction thereof, and
    wherein said second rotational shaft projects from a shaft seating portion provided at an end of said partly-opened frame in said circumferential direction.

6. The position controller according to claim 3, wherein said insertable/removable moving member comprises a pressing-force receiving portion formed as an outer peripheral surface of a cylindrical projection, the axis of which extends parallel to said optical axis,
    wherein said removal drive member comprises a removal pressing portion formed as a flat surface extending in a radial direction of rotation of said removal drive member, wherein, when said insertable/removable moving member is in said insertion position and said removal drive member is in said insertion allowance position, said pressing-force receiving portion and said removal pressing portion are spaced away from each other while facing each other, and wherein said removal pressing portion comes into contact with said pressing-force receiving portion when said removal drive member rotates from said insertion allowance position toward said forced removing position.

7. The position controller according to claim 1, wherein said insertion/removal controller comprises:

an insertion allowing biaser which biases said removal drive member toward said insertion allowance position; and a component force imparting member which is positioned away from said removal drive member in said optical axis direction when said photographing optical system is in said ready-to-photograph state, wherein, when said advancing/retracting ring moves in said optical axis direction from said first position to said second position, said component force imparting member comes in contact with said removal drive member while reducing a distance between said component force imparting member and said removal drive member in said optical axis direction and imparts a component force against said removal drive member to move said removal drive member from said insertion allowance position to said forced removing position.

8. The position controller according to claim 7, wherein said component force imparting member is provided on a stationary member positioned closer to said image plane than said advancing/retracting ring when said photographing optical system is in said ready-to-photograph state, and wherein said component force imparting member comprises a projection which projects toward the object side.

9. The position controller according to claim 1, further comprising:

an anti-shake guide member which is held between a first surface formed on said advancing/retracting ring to face toward said image plane and a second surface formed on said anti-shake moving member to face toward the object side, and allows said anti-shake moving member to move relative to said advancing/retracting ring in said first plane; and a holding biaser which biases said anti-shake moving member with respect to said advancing/retracting ring in a direction to bring said first surface and said second surface close to each other so that said anti-shake guide member remains held between said first surface and said second surface.

10. The position controller according to claim 1, wherein said insertion holder comprises:

an inserting biaser which biases and moves said insertable/removable moving member toward said insertion position; and a stopper provided on said anti-shake moving member, said insertable/removable moving member being brought into contact with said stopper by a biasing force of said inserting biaser to thereby determine said insertion position.

11. The position controller according to claim 1, wherein said position controller is incorporated in a camera having a retractable lens barrel.

12. The position controller according to claim 11, wherein said advancing/retracting ring is guided linearly in said optical axis direction without rotating in said retractable lens barrel.

13. The position controller according to claim 9, wherein said anti-shake guide member comprises at least one spherical roller.

* * * * *